United States Patent
Padilla et al.

(10) Patent No.: US 10,983,047 B2
(45) Date of Patent: Apr. 20, 2021

(54) IMAGING DEVICES INCLUDING DIELECTRIC METAMATERIAL ABSORBERS AND RELATED METHODS

(71) Applicant: Duke University, Durham, NC (US)

(72) Inventors: Willie Padilla, Durham, NC (US); Kebin Fan, Durham, NC (US); Xinyu Liu, Durham, NC (US); Jonathan Suen, Durham, NC (US)

(73) Assignee: Duke University, Durham, NC (US)

( * ) Notice: Subject to any disclaimer, the term of this patent is extended or adjusted under 35 U.S.C. 154(b) by 0 days.

(21) Appl. No.: 16/213,227

(22) Filed: Dec. 7, 2018

(65) Prior Publication Data

US 2019/0178720 A1    Jun. 13, 2019

Related U.S. Application Data

(60) Provisional application No. 62/596,241, filed on Dec. 8, 2017.

(51) Int. Cl.
*G01N 21/35* (2014.01)
*G01N 21/3581* (2014.01)
*H04N 5/33* (2006.01)
*G01J 5/50* (2006.01)
*G01J 5/08* (2006.01)
*G01J 5/00* (2006.01)
*G01J 5/12* (2006.01)

(52) U.S. Cl.
CPC ........ *G01N 21/3581* (2013.01); *G01J 5/0853* (2013.01); *G01J 5/505* (2013.01); *H04N 5/33* (2013.01); *G01J 2005/0077* (2013.01); *G01J 2005/123* (2013.01)

(58) Field of Classification Search
CPC ...... G01J 5/18; H04N 5/33; H04N 2005/0077
See application file for complete search history.

(56) References Cited

U.S. PATENT DOCUMENTS

| | | |
|---|---|---|
| 4,072,863 A | 2/1978 | Roundy |
| 5,420,419 A | 5/1995 | Wood |
| 8,513,606 B2 | 8/2013 | Oda |
| 8,618,483 B2 | 12/2013 | Kurashina et al. |
| 10,054,839 B1 * | 8/2018 | Brener ............... G02F 1/353 |
| 2006/0214113 A1 | 9/2006 | Kleinerman |

(Continued)

FOREIGN PATENT DOCUMENTS

WO    2017094280 A1    6/2017

OTHER PUBLICATIONS

"NEC develops ultra-sensitive terahertz camera—Major progress towards practical applications, such as non-destructive inspection and detection of foreign substances" https://www.nec.com/en/press/201411/global_20141111_01.html.

(Continued)

*Primary Examiner* — Hugh Maupin
(74) *Attorney, Agent, or Firm* — Olive Law Group, PLLC

(57) ABSTRACT

Imaging devices including dielectric metamaterial absorbers and related methods are disclosed. According to an aspect, an imaging device includes a support. The imaging device also includes multiple dielectric metamaterial absorbers attached to the support. Each absorber includes one or more dielectric resonators configured to generate and emit thermal heat upon receipt of electromagnetic energy.

17 Claims, 30 Drawing Sheets

(56) References Cited

U.S. PATENT DOCUMENTS

| | | | | |
|---|---|---|---|---|
| 2013/0112876 | A1* | 5/2013 | Nam | G01J 5/046 |
| | | | | 250/338.1 |
| 2015/0276489 | A1* | 10/2015 | Cumming | G01J 5/0881 |
| | | | | 250/338.3 |
| 2015/0340521 | A1* | 11/2015 | Kempa | H01L 31/02168 |
| | | | | 136/256 |
| 2016/0018267 | A1 | 1/2016 | Timofeev | |
| 2017/0261377 | A1* | 9/2017 | Alves | G01J 5/40 |

OTHER PUBLICATIONS

Benford, Dominic, C. et al. 2003. "Superconducting Bolometer Array Architectures" Proceedings of Spie Journal, published Feb. 17, 2003 (sixteen (16) pages) doi: 10.1117/12.459423.

Grossman, E.N., et al. 2009 "A Passive, Real-time, Terahertz Camera for Security Screening, using Superconducting Microbolometers" 1453-1456, doi: 10.1109/MWSYM.2009. 5165981 (four (4) pages).

Hack, Erwin et al. 2016 "Comparison of Thermal Detector Arrays for Off-Axis THz Holography and Real-Time THz Imaging" Sensors, 16, 221 Published Feb. 2, 2016 (eleven (11) pages) doi:10. 3390/s16020221.

Holden, A. 2013 "Pyroelectric Sensor Arrays for Detection and Thermal Imaging" Proceedings of Spie Journal, Published Jun. 11, 2013 (eleven (11) pages) doi: 10.1117/12.2014239.

Niklaus, F., et al, 2008. "MEMS-Based Uncooled Infrared Bolometer Arrays—A Review" Proceedings of Spie Journal. Published Jan. 4, 2008 (sixteen (16) pages) doi:10.1117/12.755128.

Nemoto et al., 2016 "High-Sensitivity and Broadband, Real-Time Terahertz Camera Incorporating a Micro-Bolometer Array With Resonant Cavity Structure" IEEE Transactions on Terahertz Science and Technology. Published Mar. 2016 (eight (8) pages).

Oda, N. et al., 2016 "Palm-Size and Real-Time Terahertz Imager, and its Application to Development of Terahertz Sources" Proceedings of Spie Journal. Published 2016 (ten (10) pages).

Kuznetsov, S. A., et al. 2011 "Bolometric THz-to-IR Converter for Terahertz Imaging" Applied Physics Letters Journal. Published 2011 (four (4) pages).

Lee, A. et al., 2005 "Real-time, continuous-wave terahertz imaging by use of a microbolometer focal-plane array" Optics Letters. Published Oct. 1, 2005 (three (3) pages).

Behnken, B. N., 2008 "Real-time Imaging Using a 2.8 THz Quantum Cascade Laser and Uncooled Infrared Microbolometer Camera" Optics Letters. vol. 33, No. 5. Published Mar. 1, 2008. (three (3) pages).

* cited by examiner

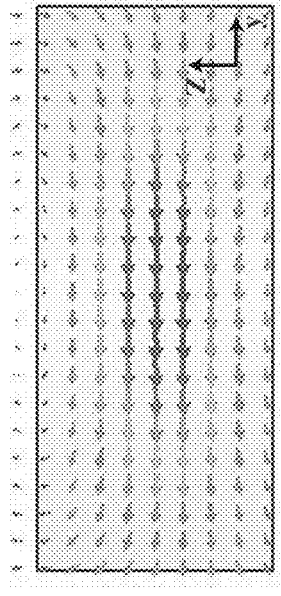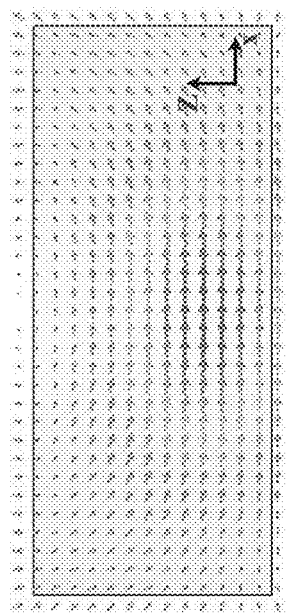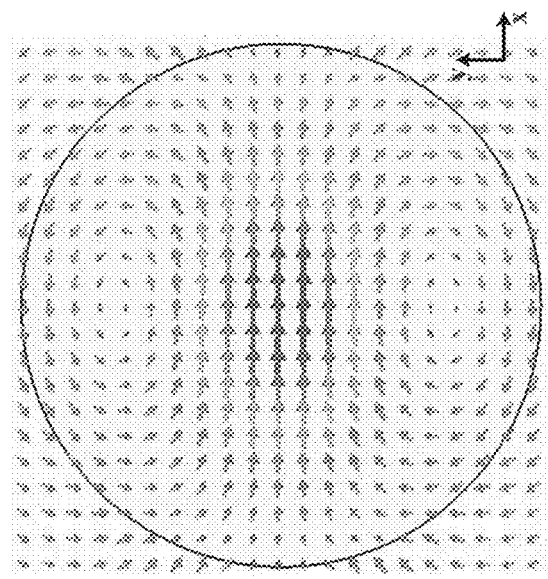
FIG. 9A
FIG. 9B
FIG. 9C
FIG. 9D

# IMAGING DEVICES INCLUDING DIELECTRIC METAMATERIAL ABSORBERS AND RELATED METHODS

CROSS REFERENCE TO RELATED APPLICATION

This application claims priority to U.S. Patent Application No. 62/596,241, filed Dec. 8, 2017, and titled SYSTEMS AND DEVICES FOR TERAHERTZ IMAGING AND METHODS OF USING SAME, the content of which is incorporated herein by reference in its entirety.

FEDERALLY SPONSORED RESEARCH OR DEVELOPMENT

This invention was made with government support under grant number DE-SC0014372 awarded by the United States Department of Energy. The government has certain rights to this invention.

TECHNICAL FIELD

The presently disclosed subject matter relates generally to imaging. Particularly, the presently disclosed subject matter relates to imaging devices including dielectric metamaterial absorbers and related methods.

BACKGROUND

Discoveries over the past decades have unveiled unique characteristics of the far-infrared or terahertz (THz) spectrum spanning from 0.3 THz to 10 THz, including non-ionization of biological materials, easy penetration into dielectric and non-polarized objects, and spectral fingerprints of most materials and molecules. These characteristics present great promise for terahertz imaging and detection. Practical applications include screening for skin cancer, concealed weapons detection, and identification of hazardous substances at a standoff.

Subsequently, different techniques, such as near-field imaging, THz tomography, time reversal imaging, and interferometric imaging, have been developed based on the terahertz time-domain spectroscopic (THz-TDS) technique. TDS provides significant signal-to-noise ratio but requires acquisition time that is too long to perform real-time imaging. Other conventional THz detectors based on semiconductor and superconductor structures normally require complicated and expensive system designs due to the necessity of cryogenic operation. Some techniques directly utilizing uncooled micro-bolometer arrays can be implemented, but they generally operate above 1 THz due to the low efficiency of the absorber layer in the sub-terahertz (0.1-1 THz) ranges. In addition, the small size of pixels lead significant interference fringes requiring complicate post-processing.

In view of the foregoing, there is a need for improved systems and techniques for far-infrared and terahertz imaging.

BRIEF DESCRIPTION OF THE DRAWINGS

Figure 1A:
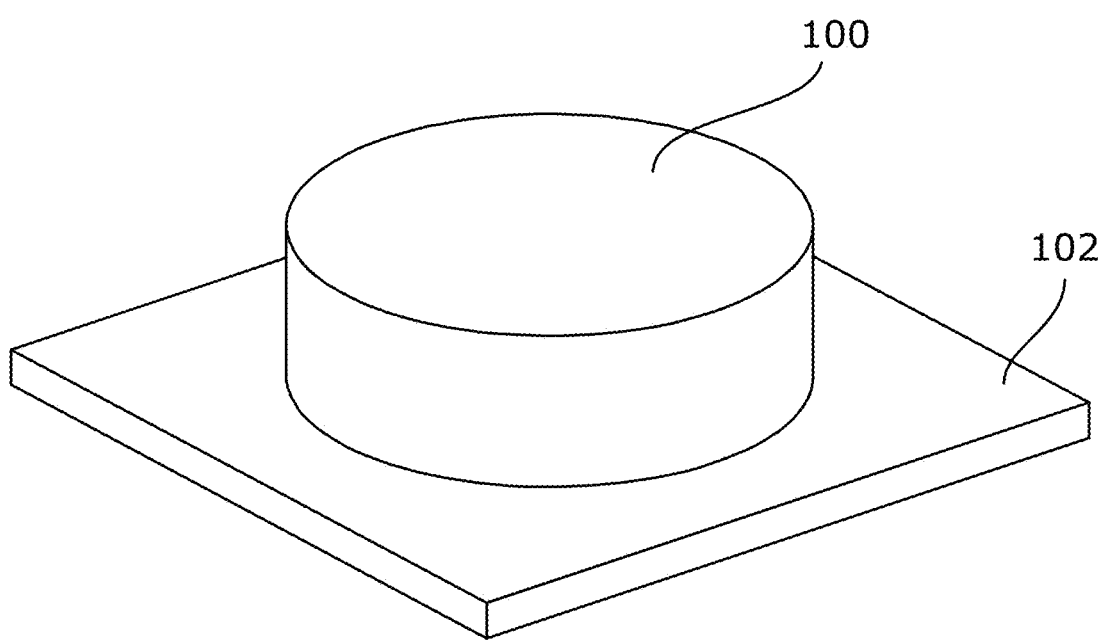
Figure 1B:
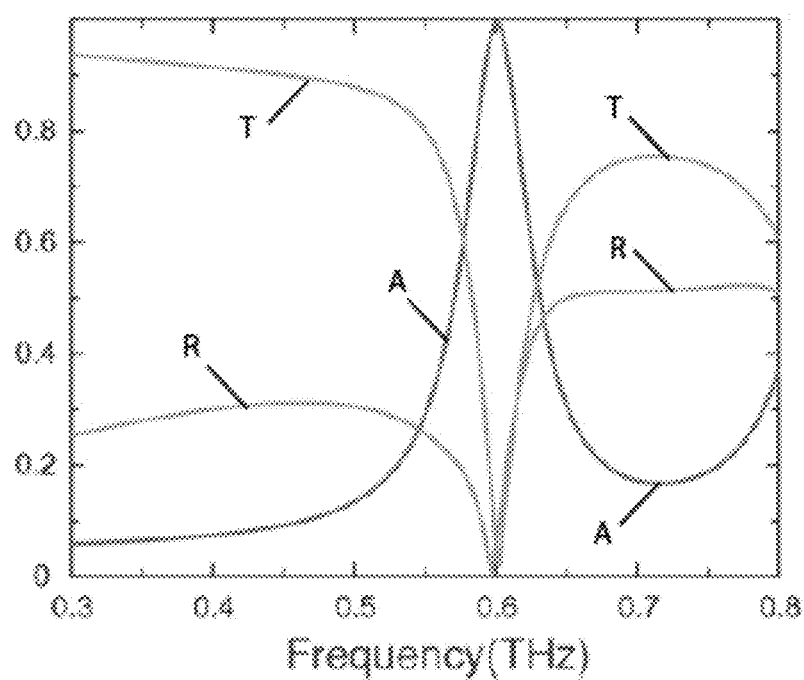
Figure 2A:
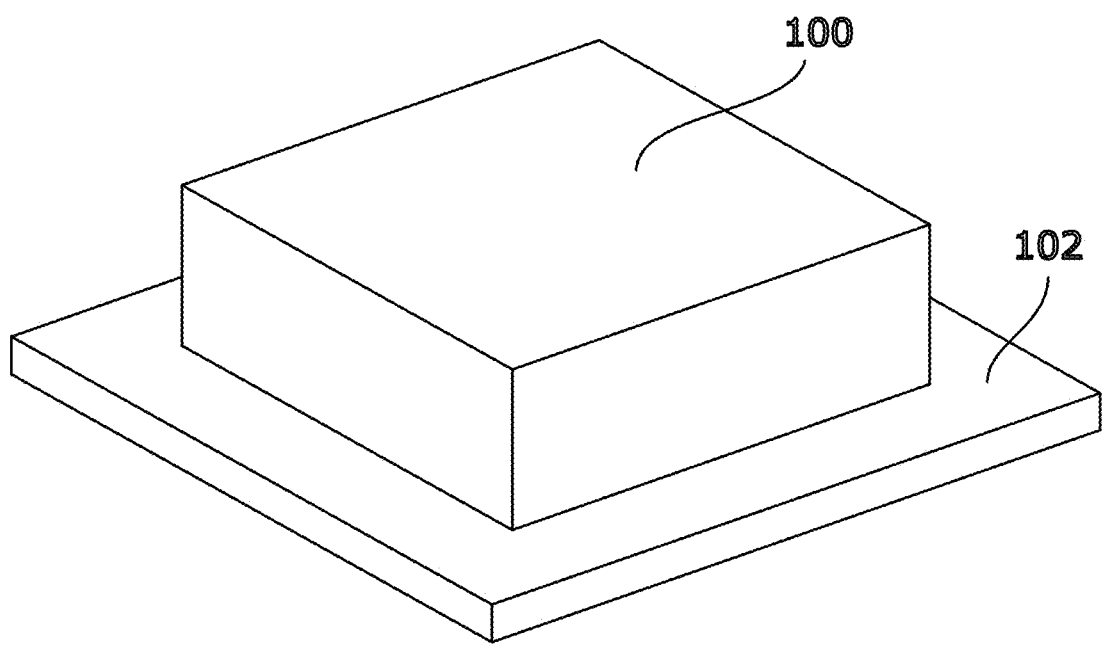
Figure 2B:
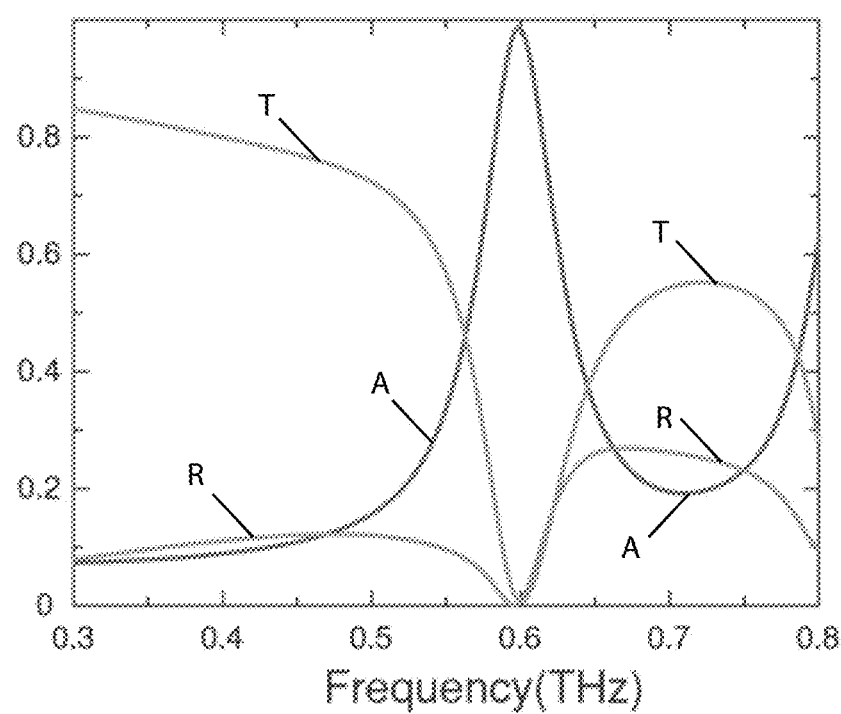
Figure 3:
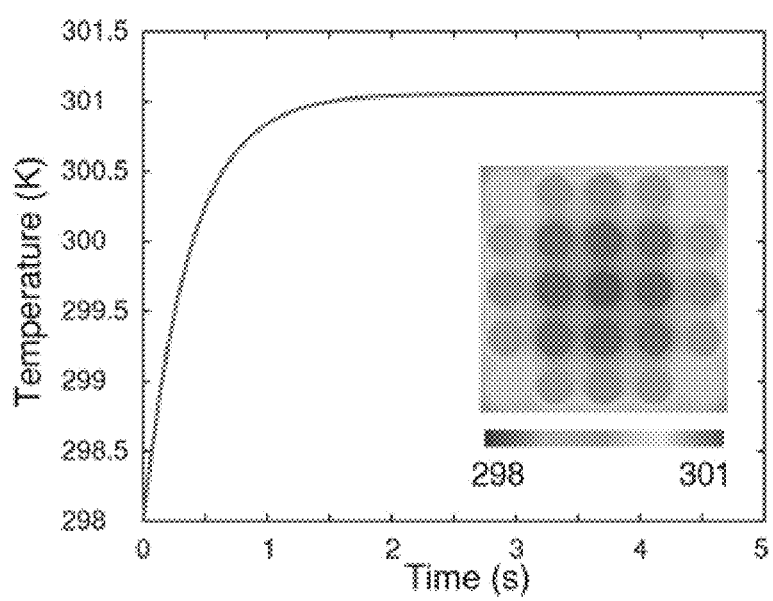
Figure 4:
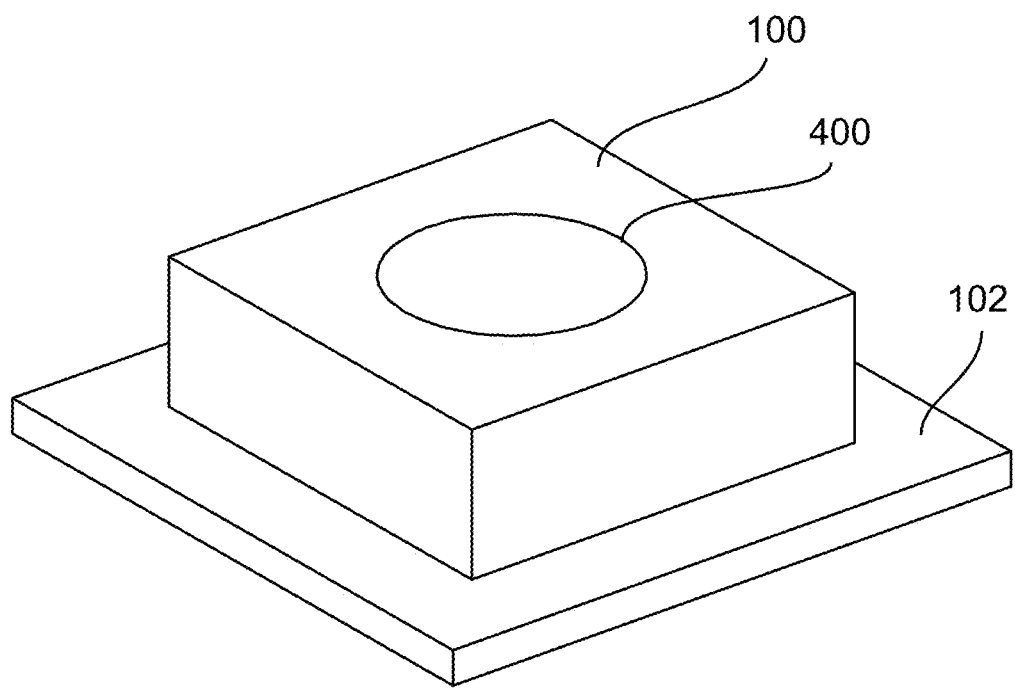
Figure 5A:
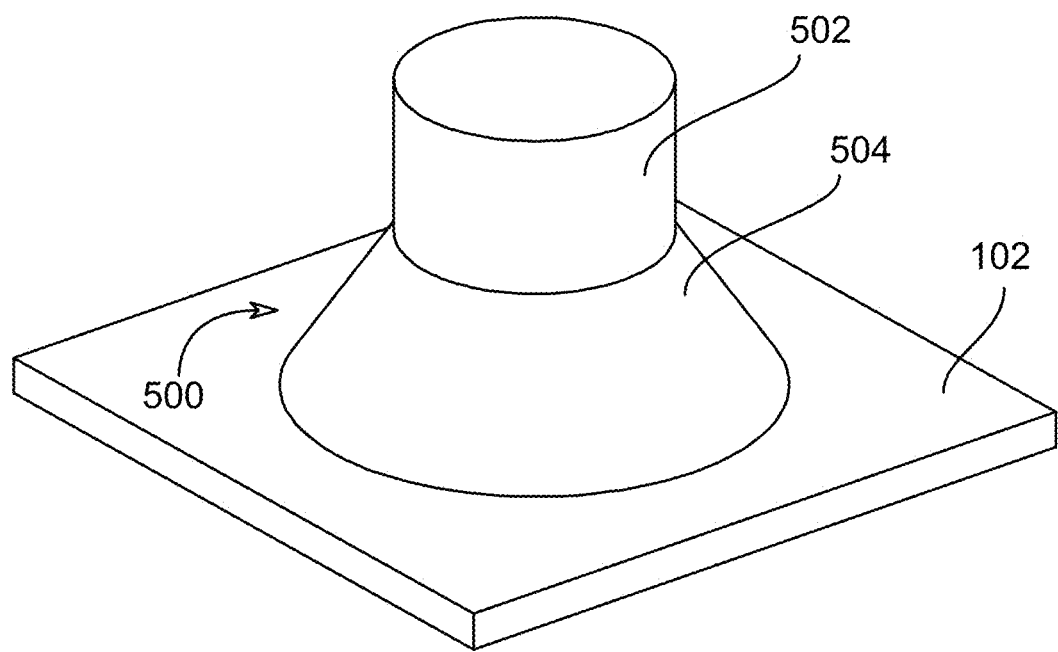
Figure 5B:
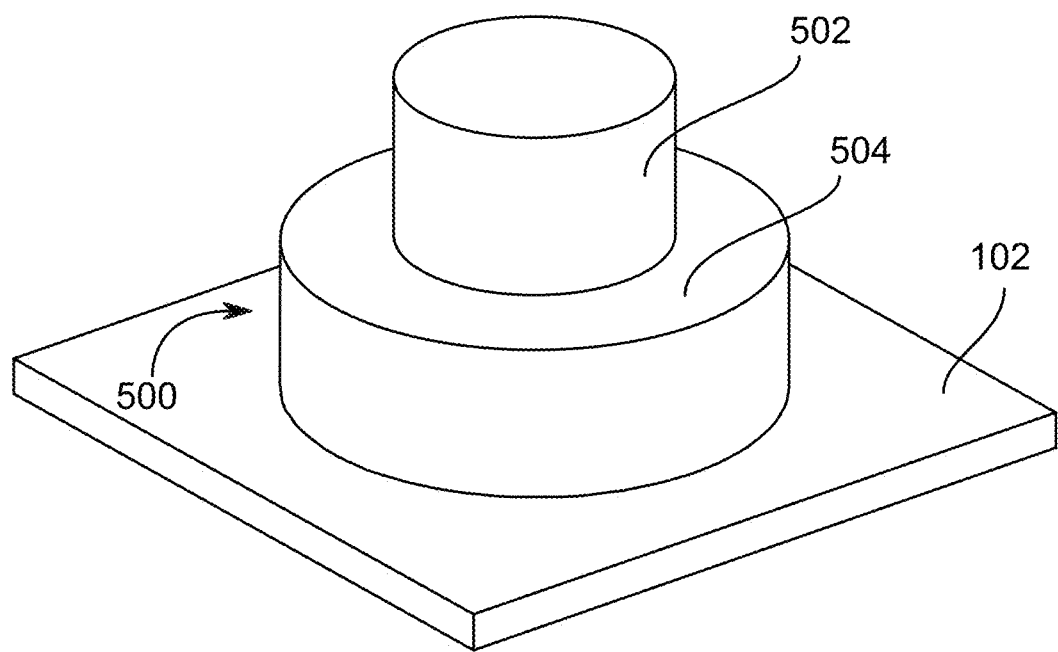
Figure 7B:
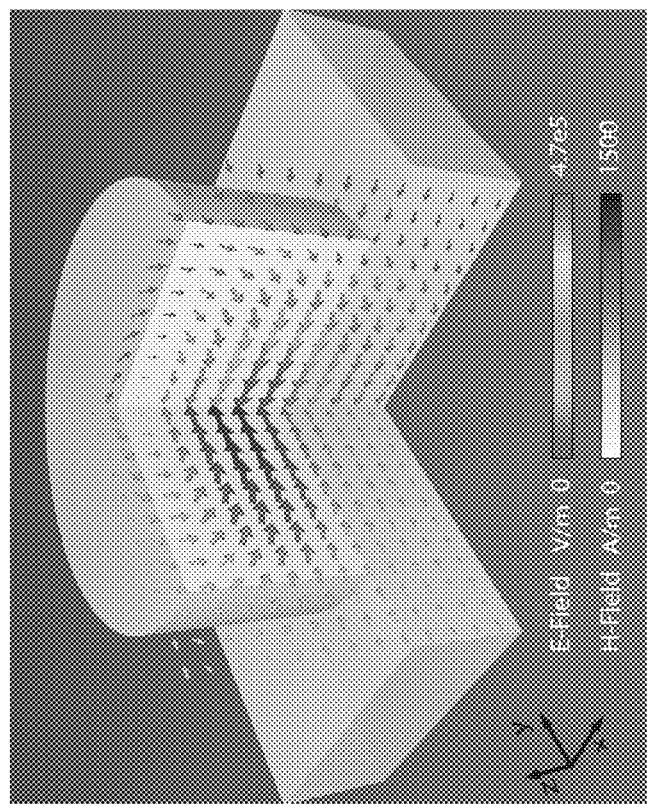
Figure 7A:
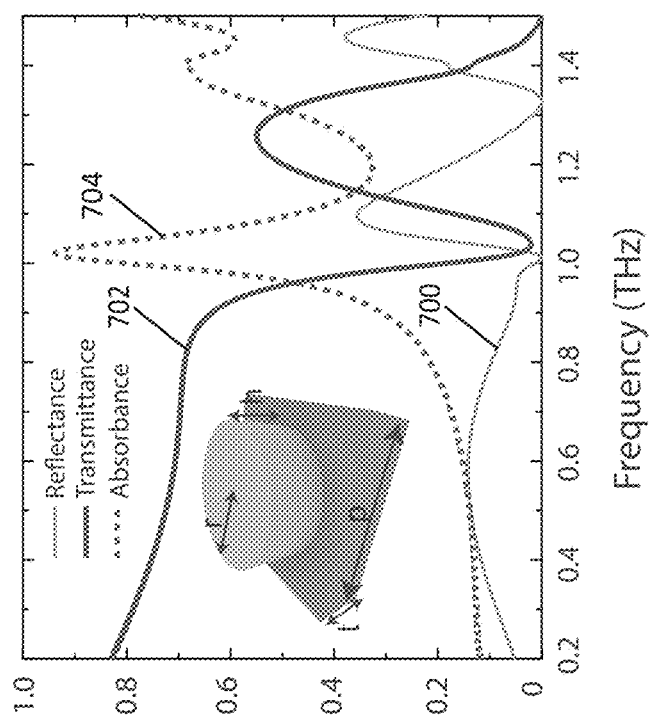
Figure 8A:
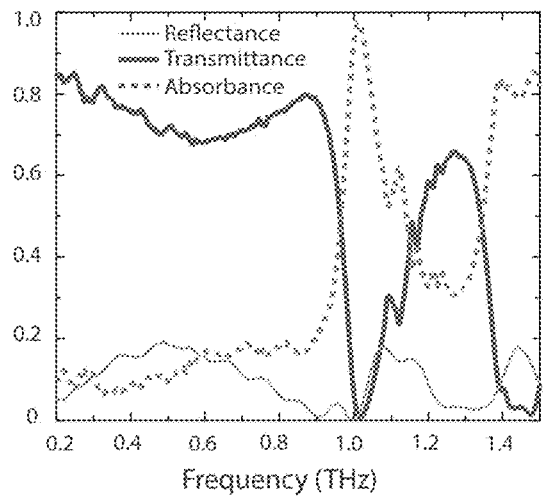
Figure 8B:
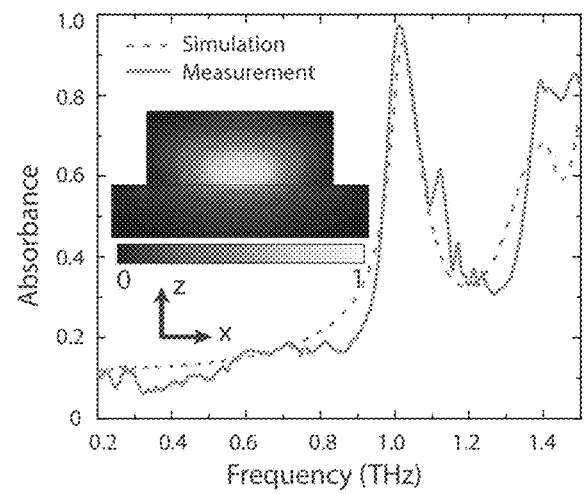
Figure 8C:
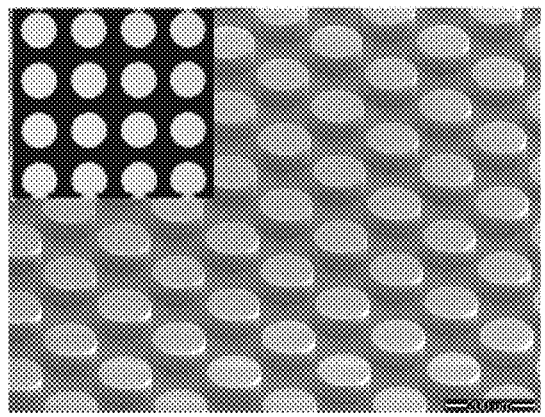
Figure 8D:
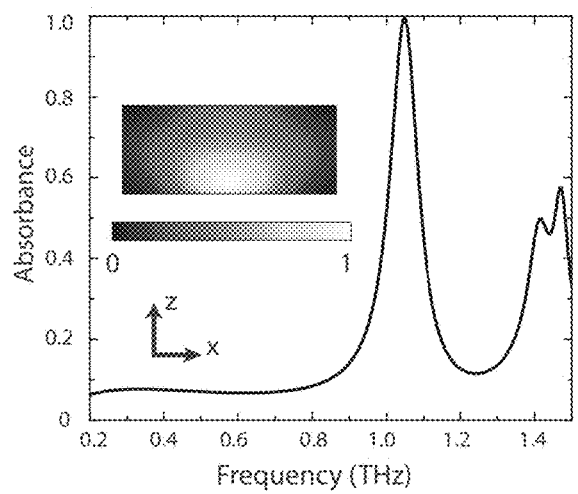
Figure 10A:
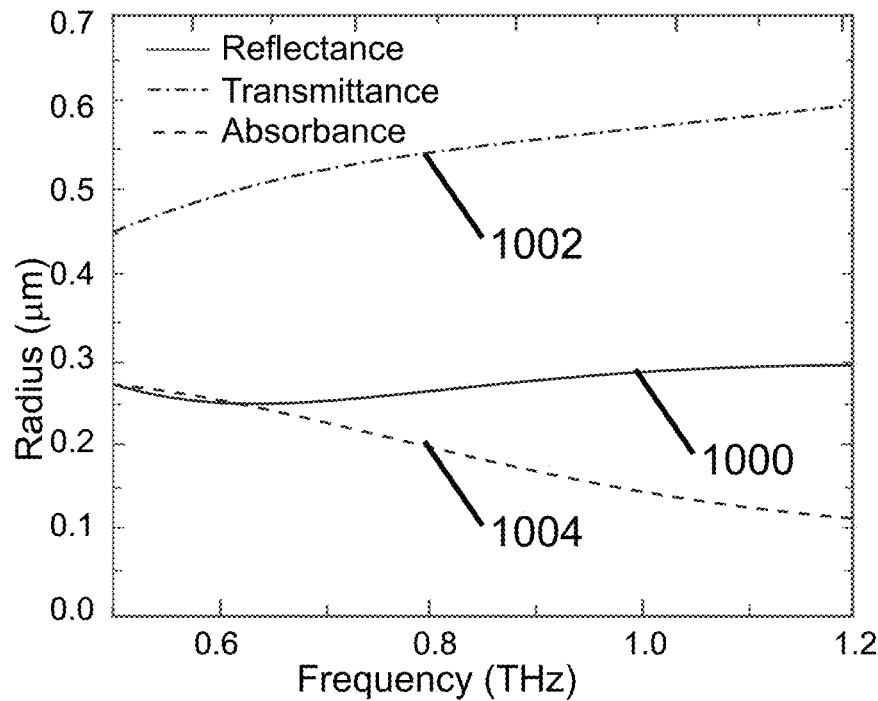
Figure 10B:
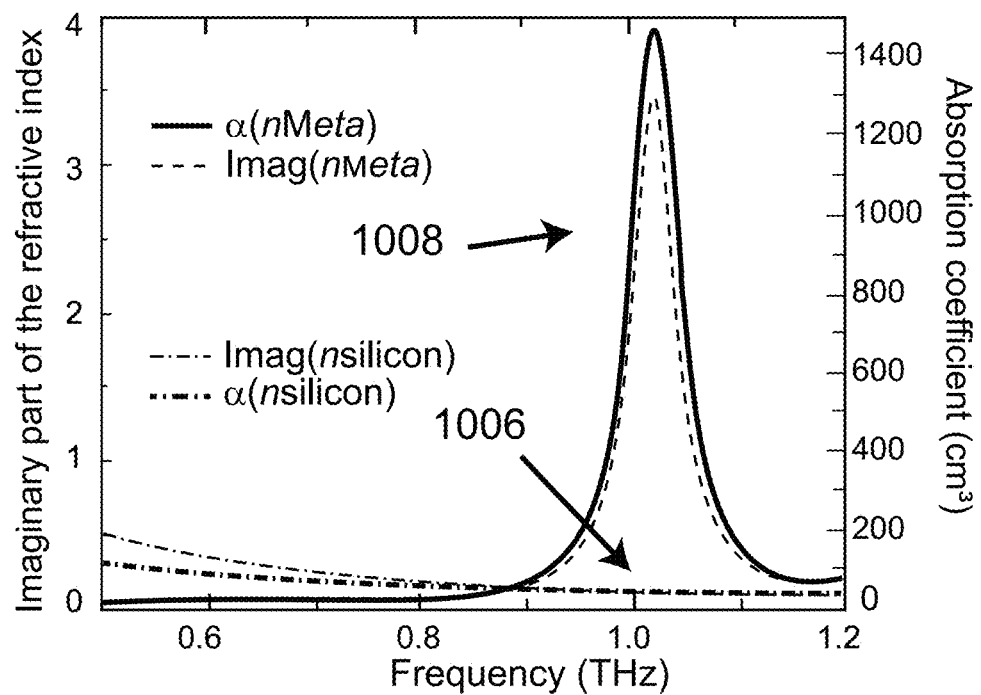
Figure 11A:
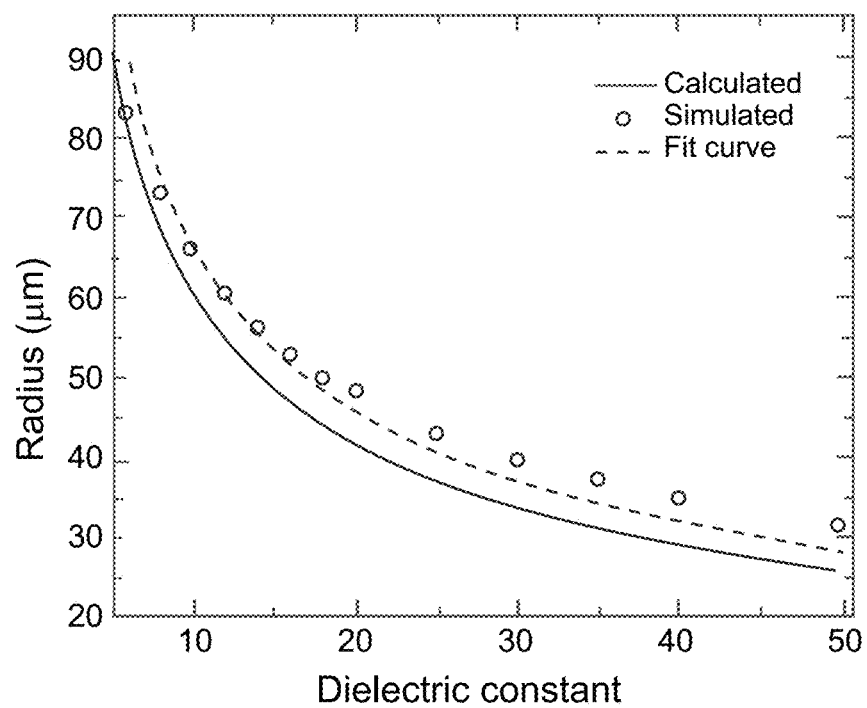
Figure 11B:
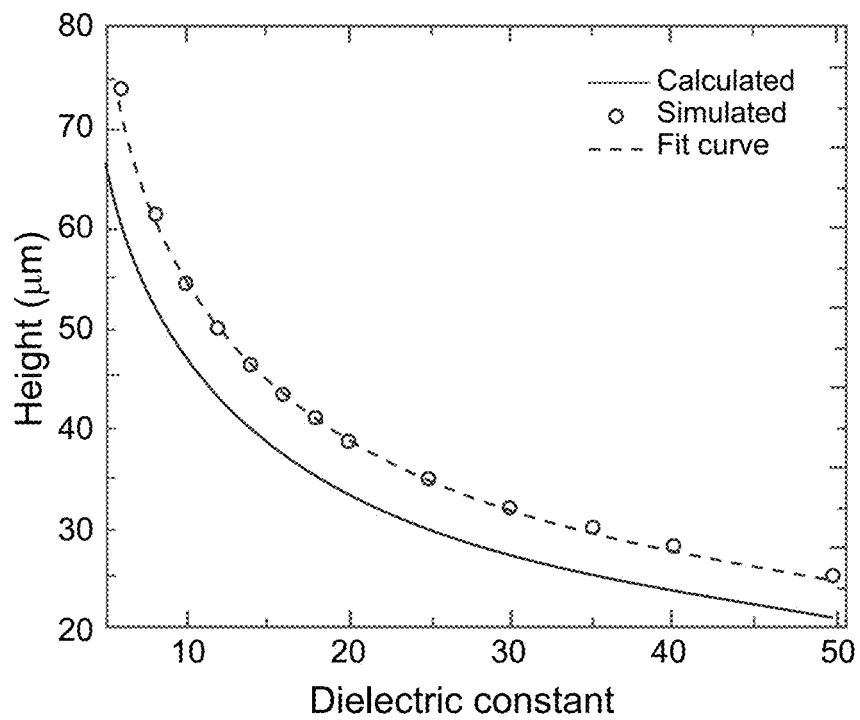
Figure 12A:
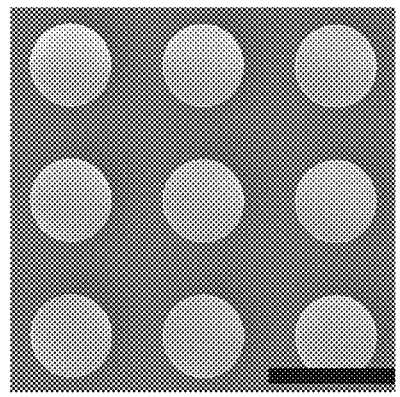
Figure 12B:
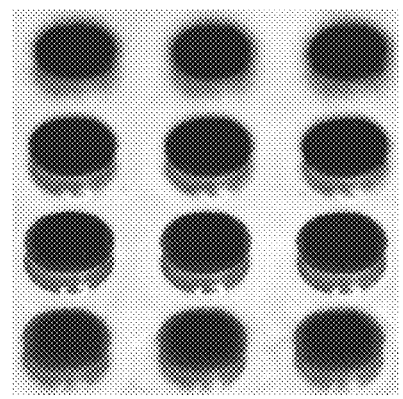
Figures 12C, 12D:
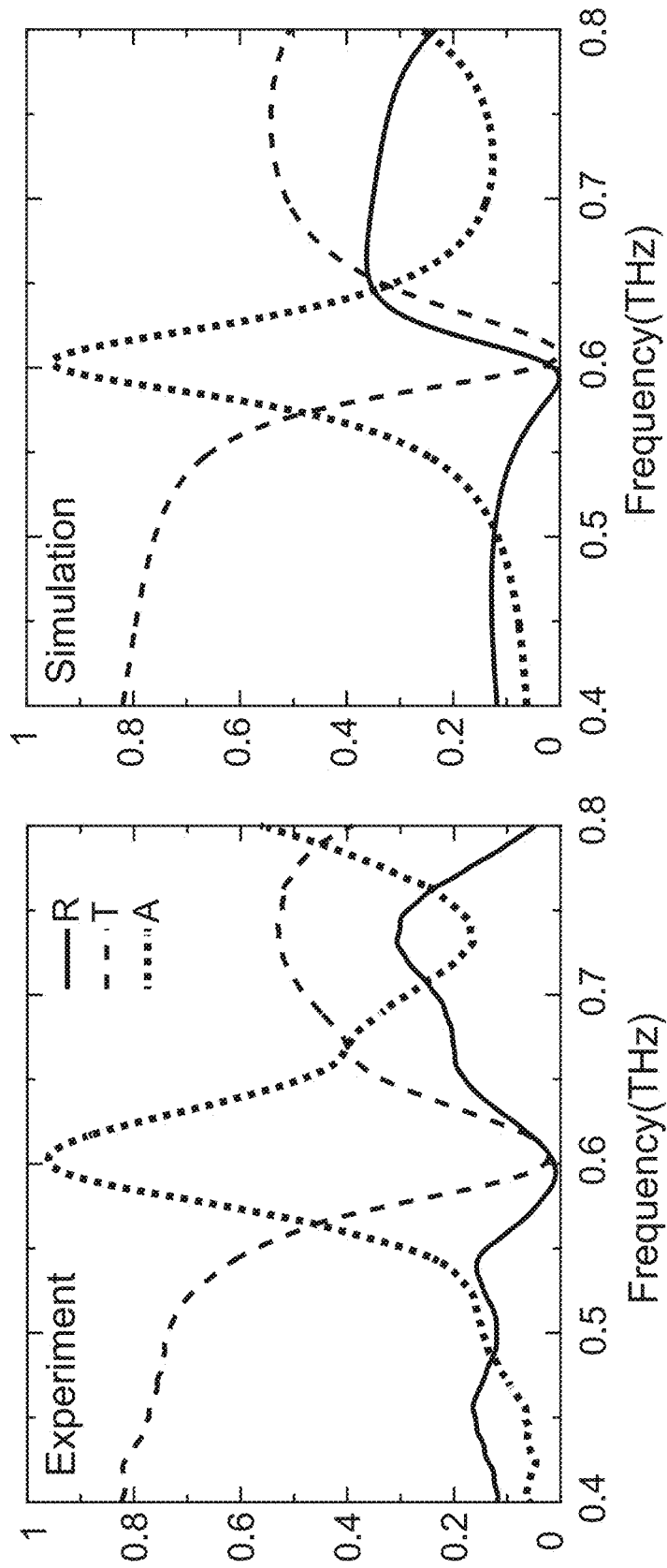
Figure 13A:
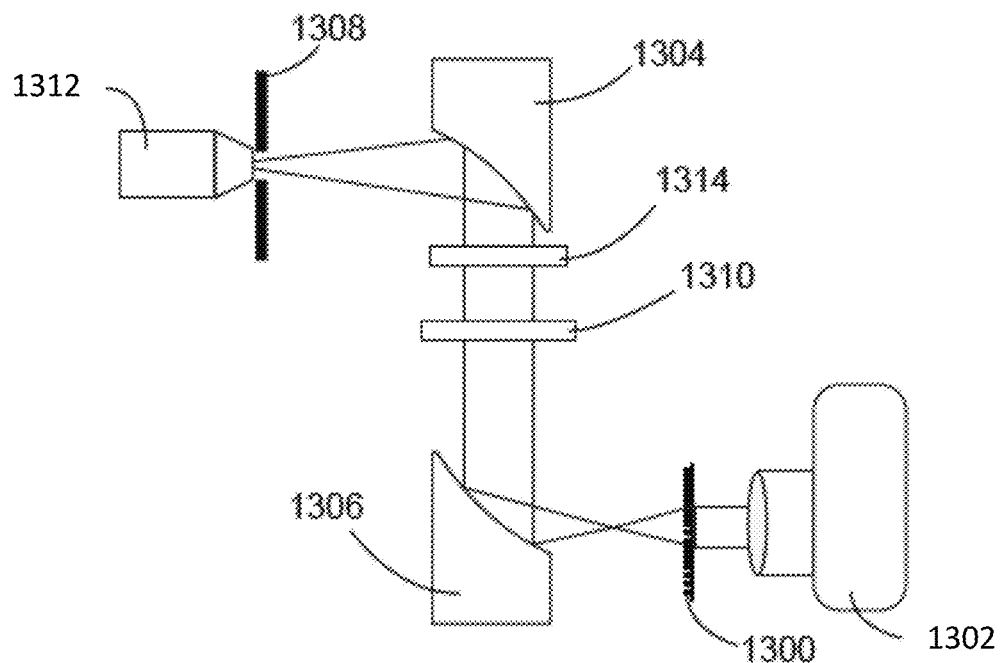
Figure 13B:
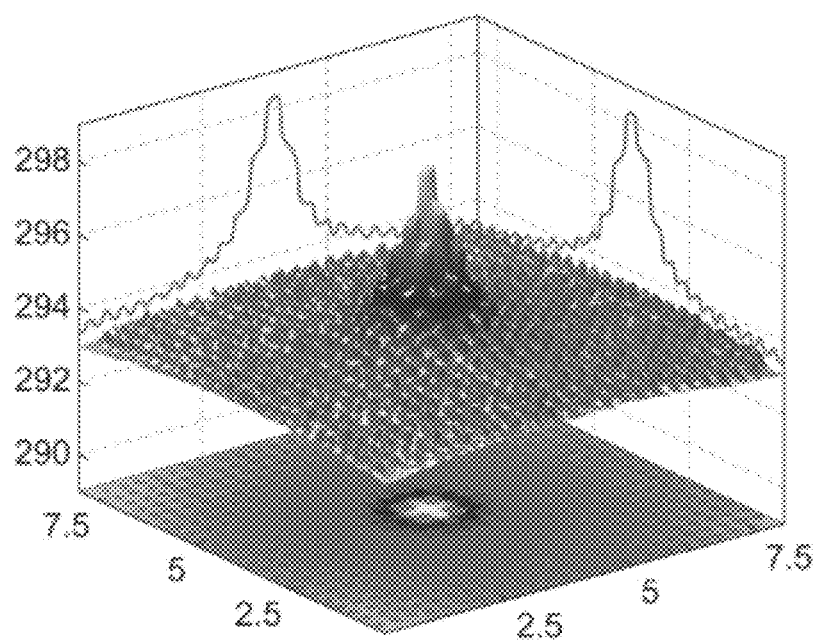
Figure 13C:
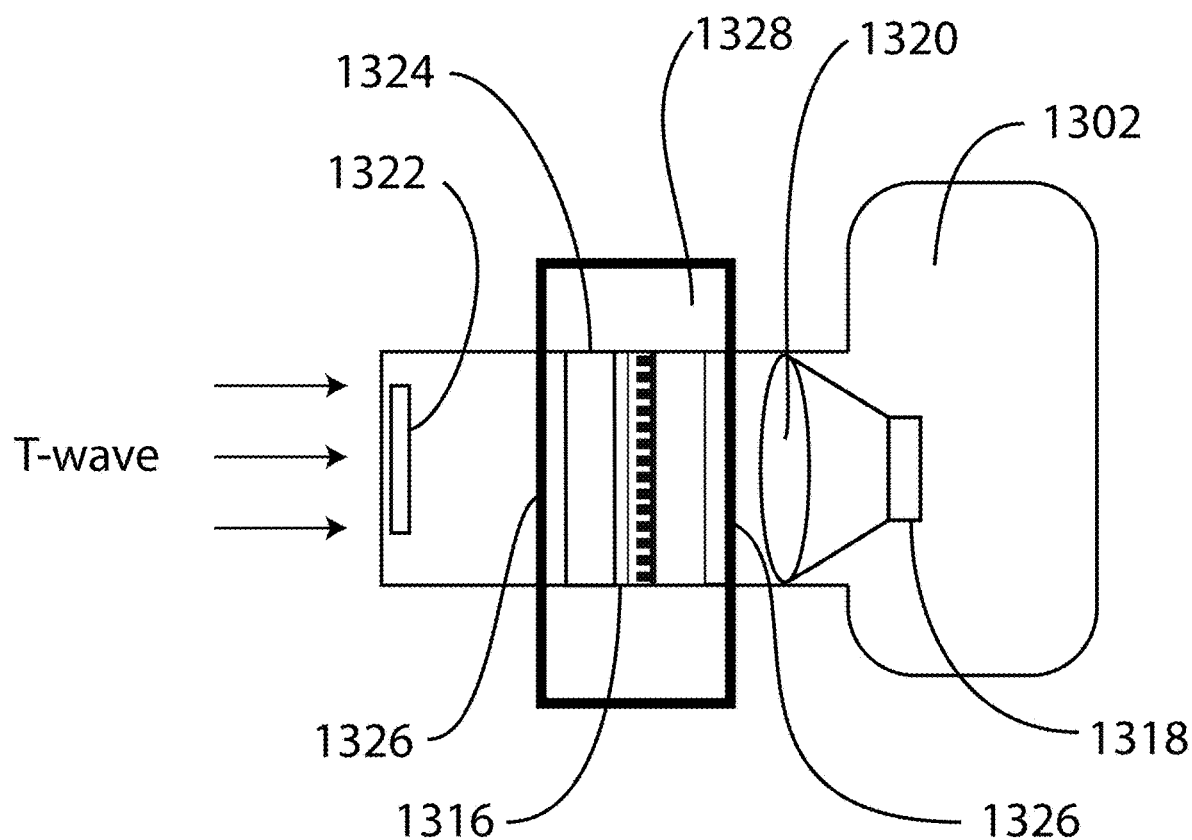
Figure 14A:
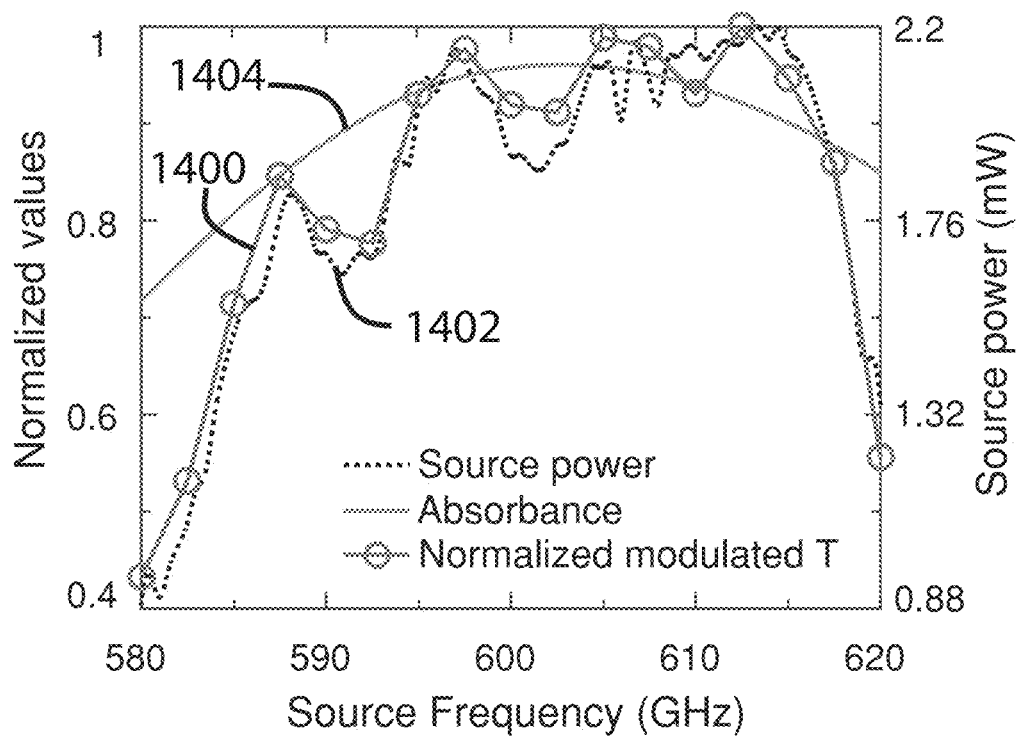
Figure 14B:
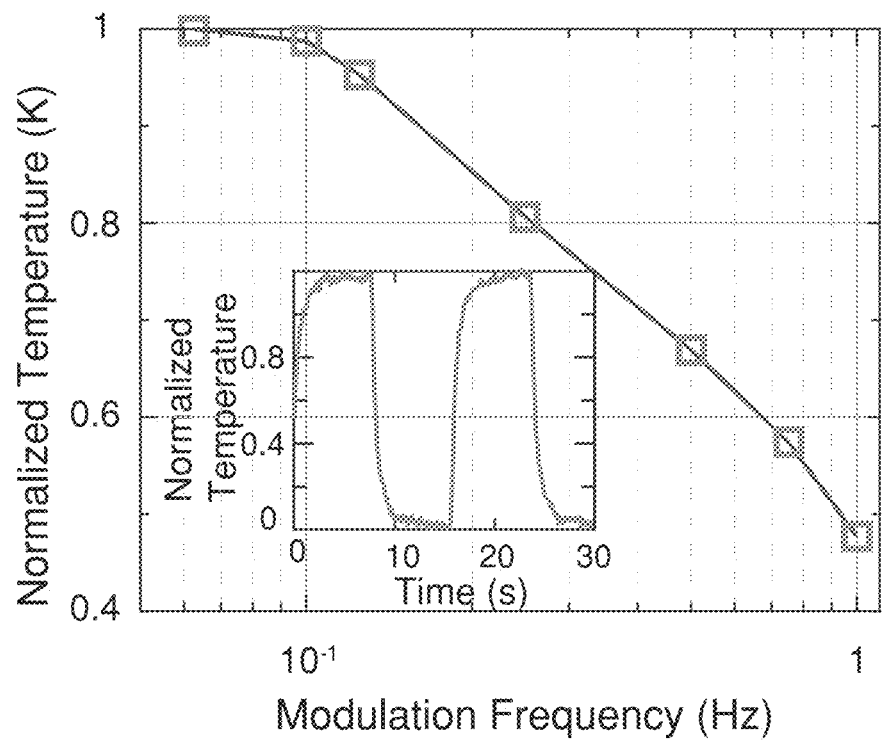
Figure 15A:
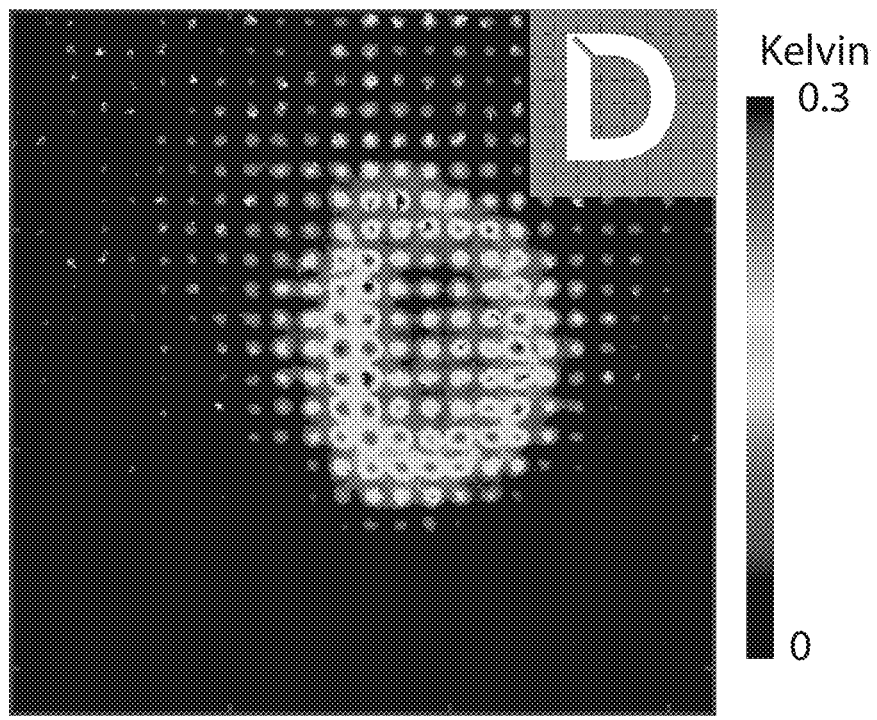
Figure 15B:
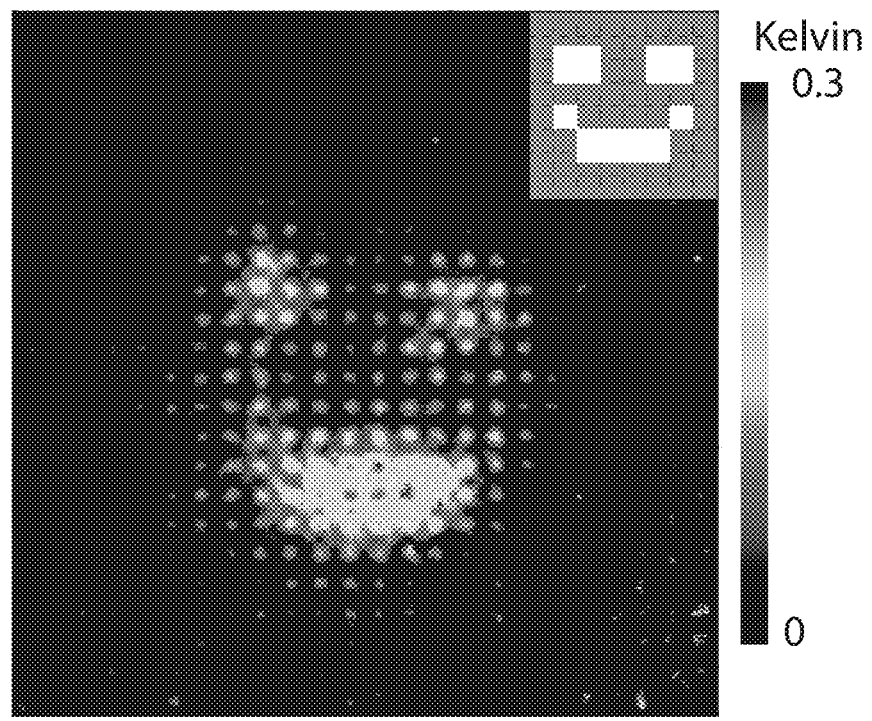
Figure 16A:
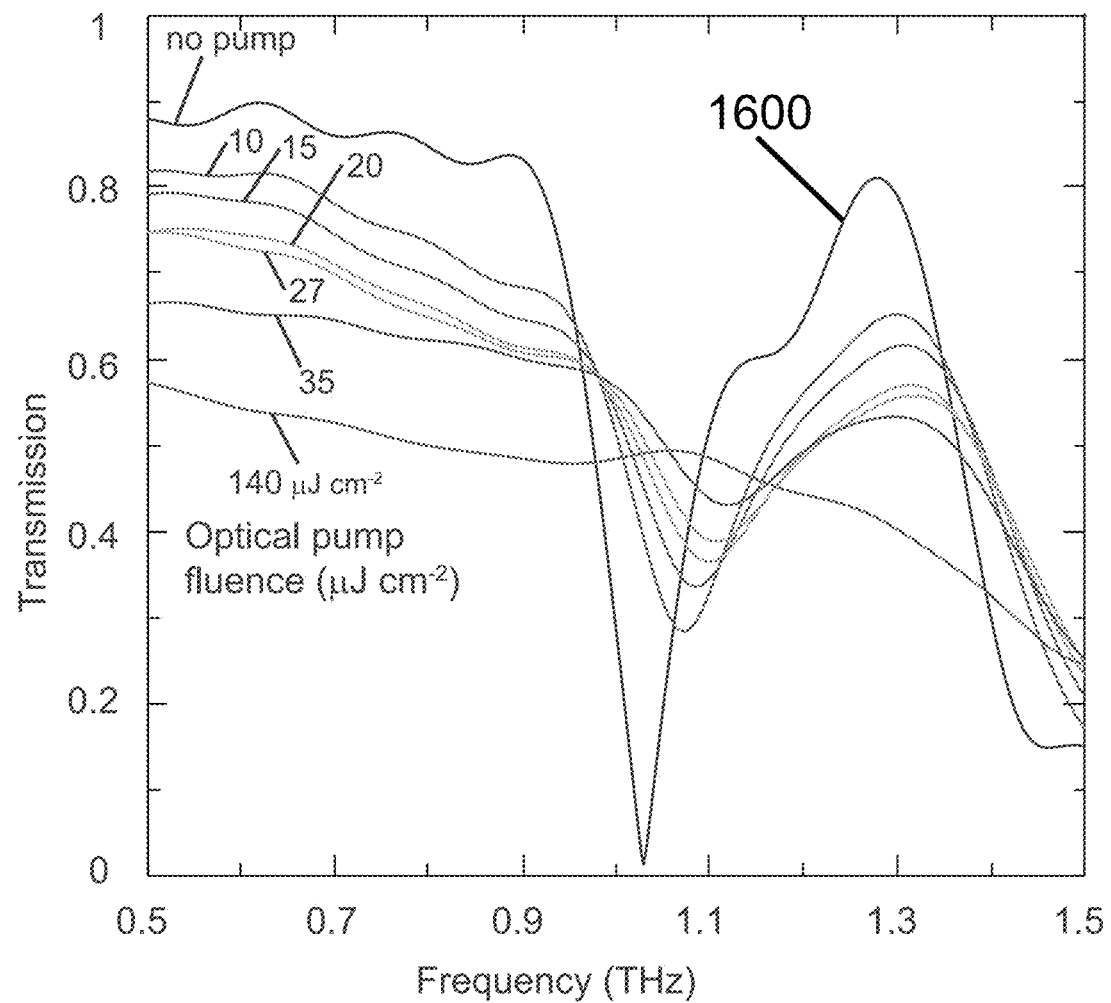
Figure 16B:
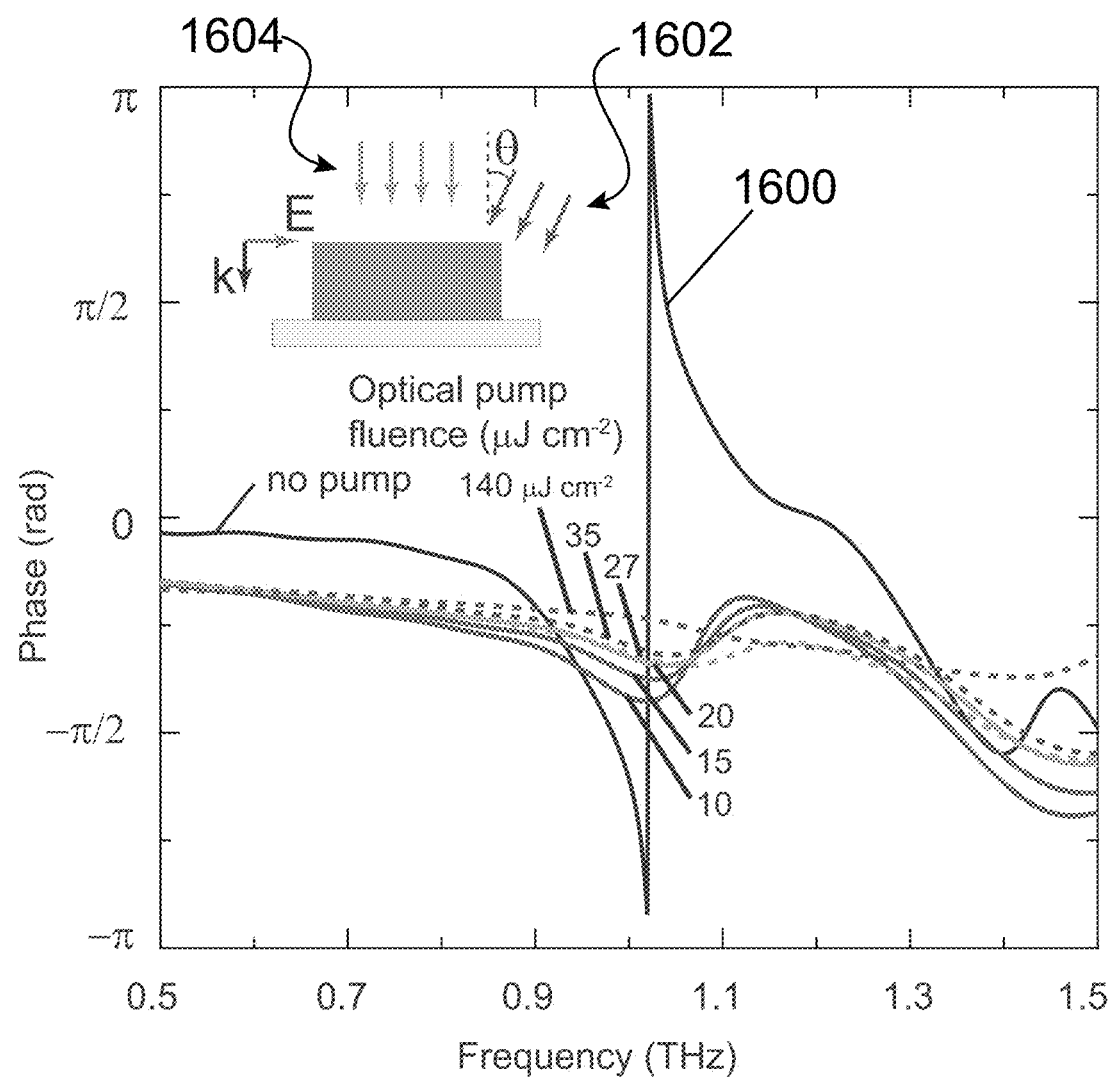
Figure 17A:
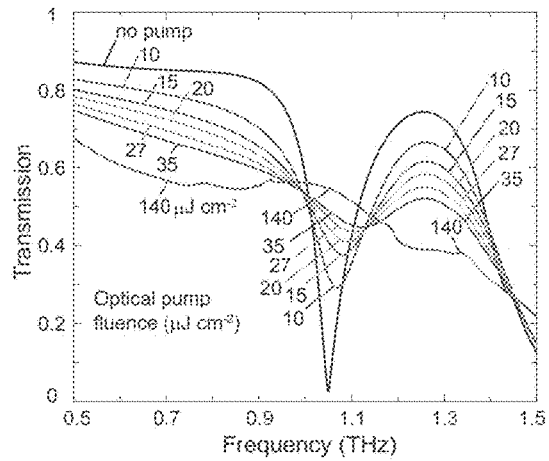
Figure 17B:
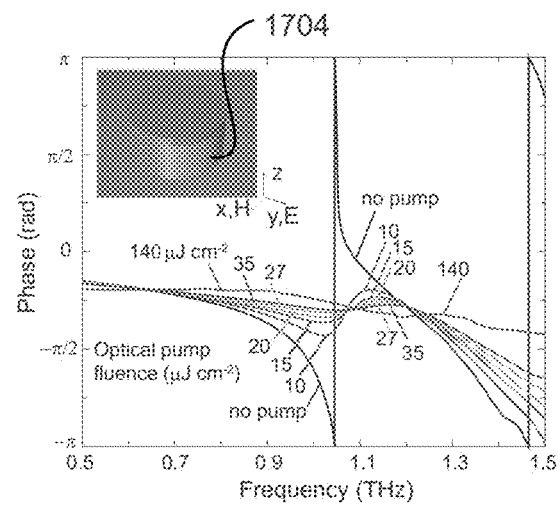
Figure 17C:
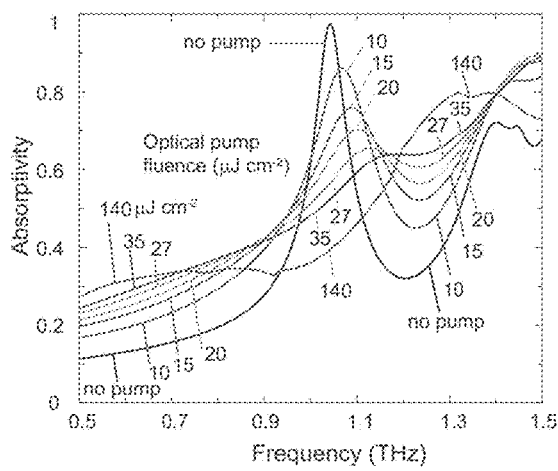
Figure 17D:
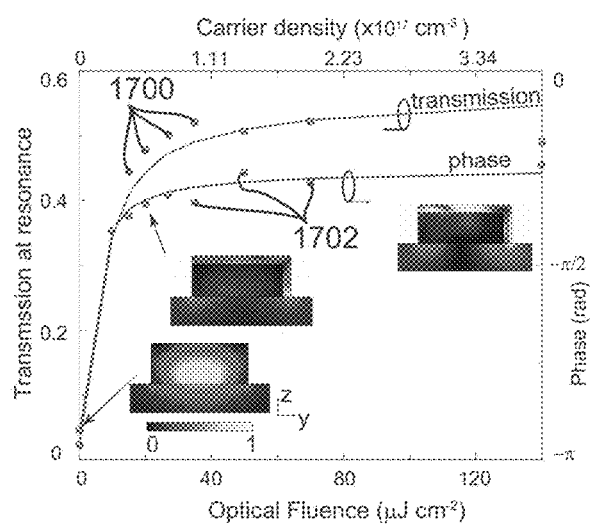
Figure 19A:
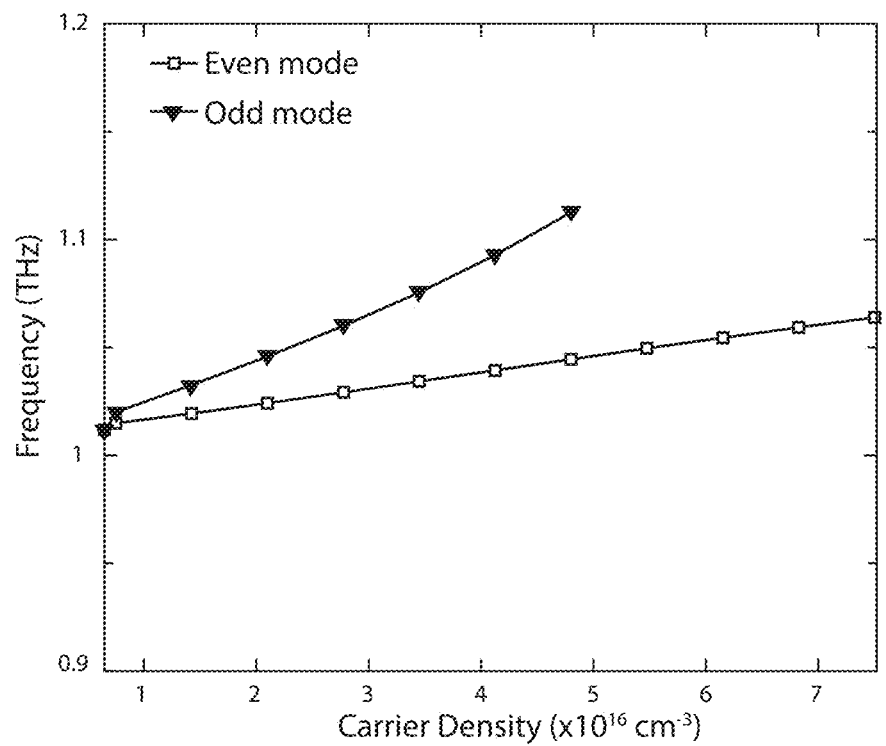
Figure 19B:
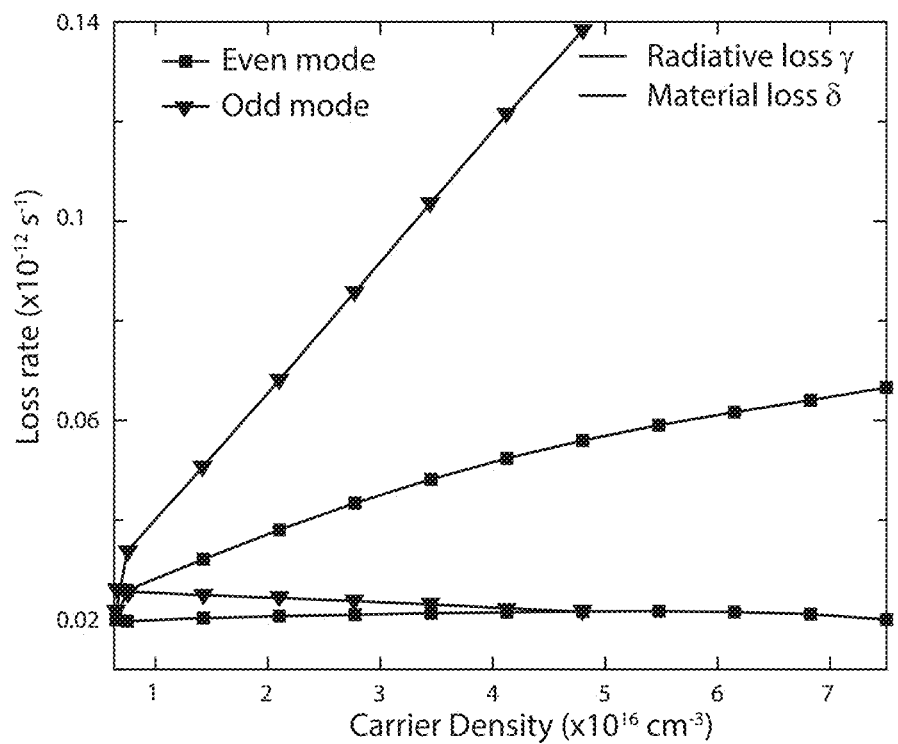
Figure 20A:
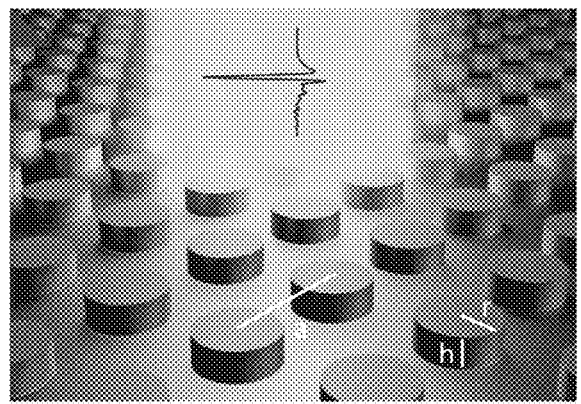
Figure 20B:
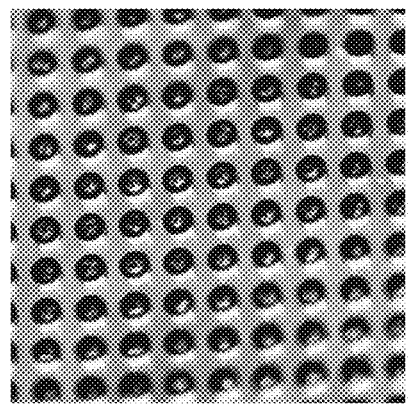
Figure 20C:
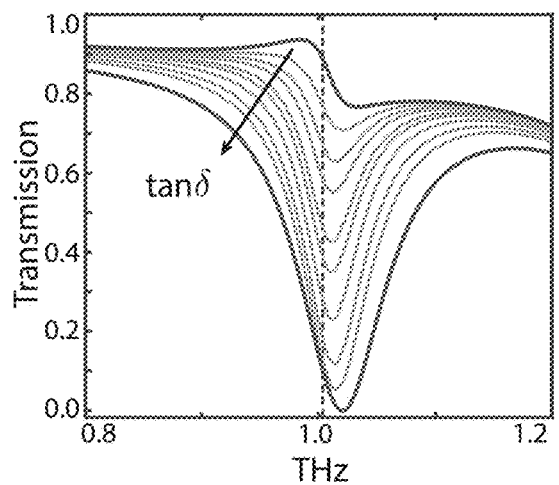
Figure 20D:
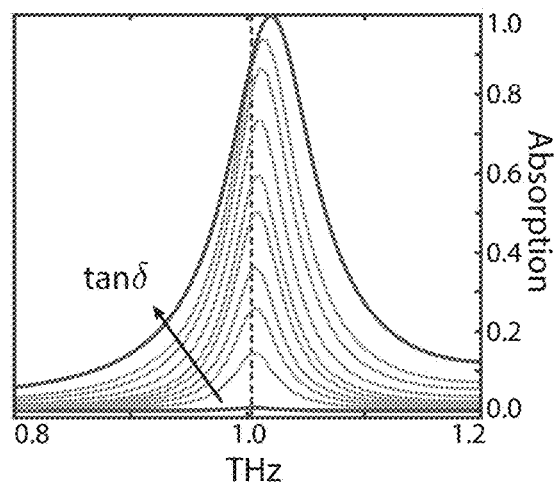
Figure 21A:
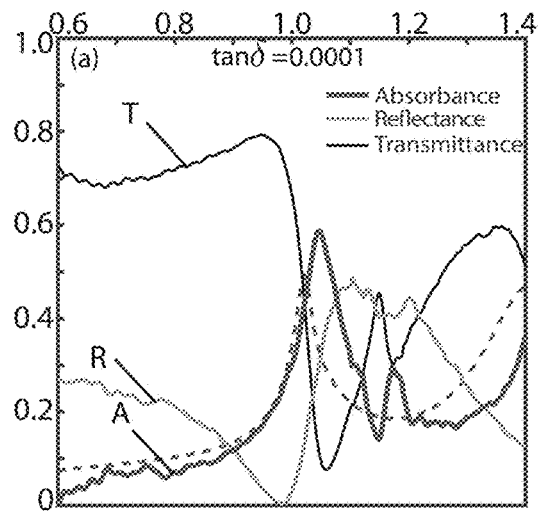
Figure 21B:
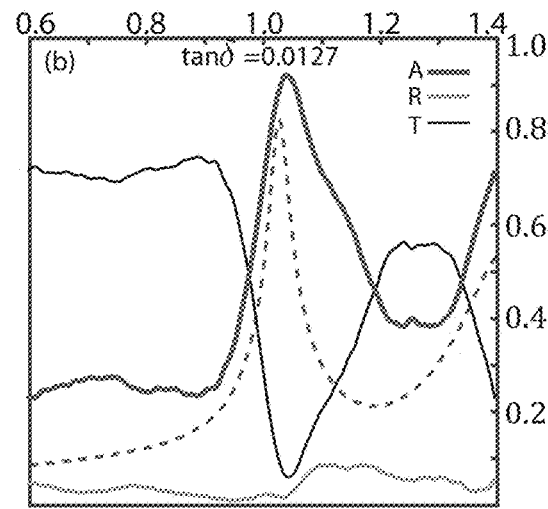
Figure 21C:
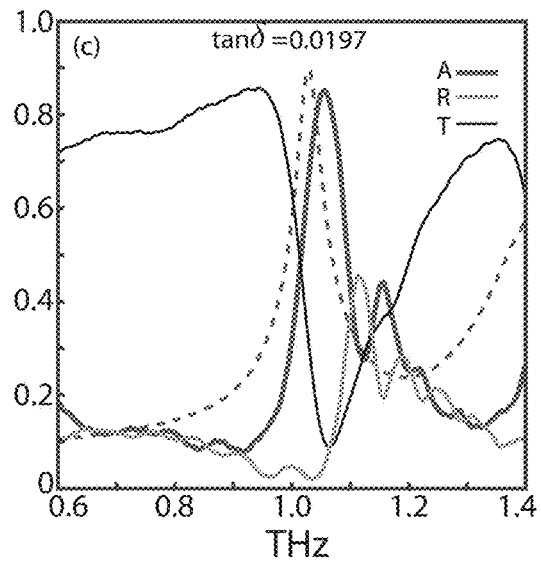
Figure 21D:
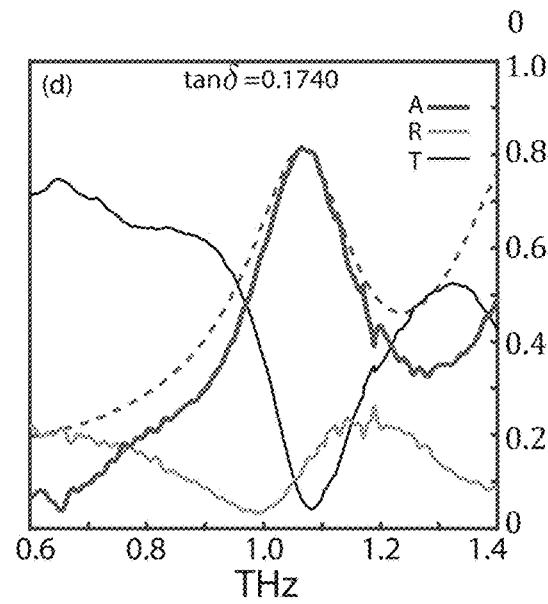
Figure 23A:
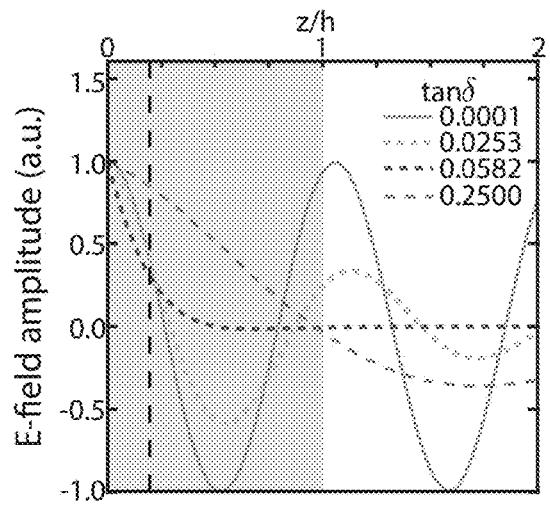
Figure 23B:
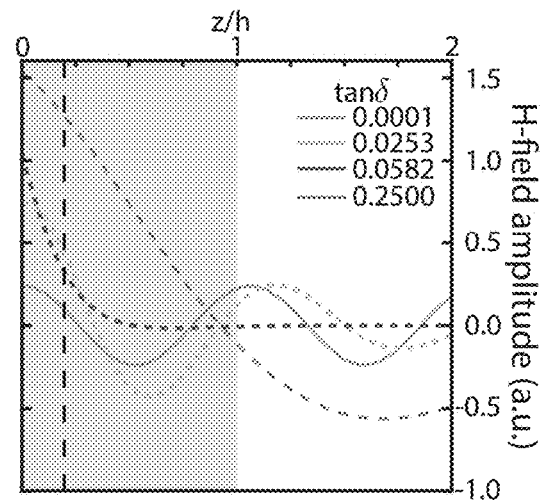
Figure 23C:
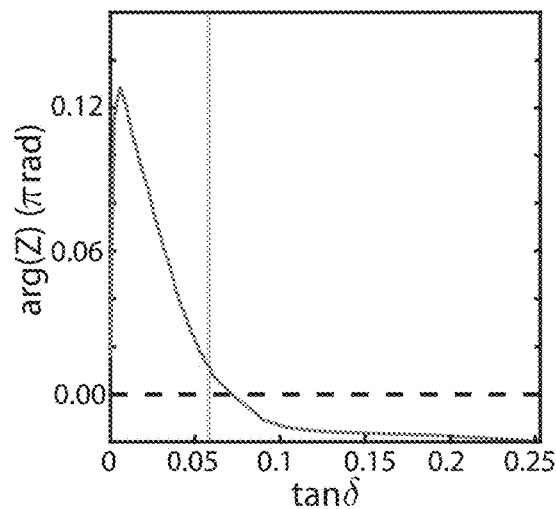
Figure 23D:
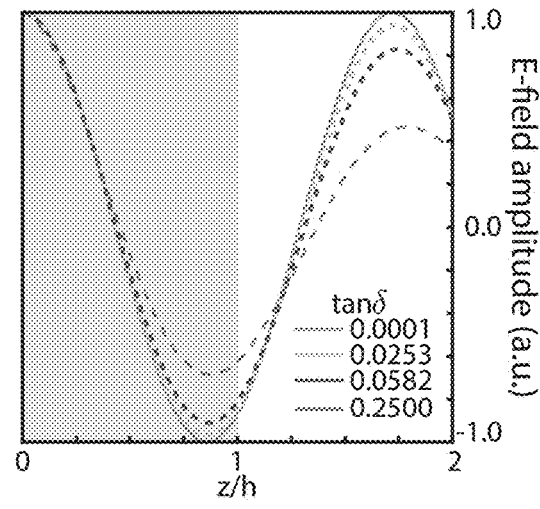
Figure 24A:
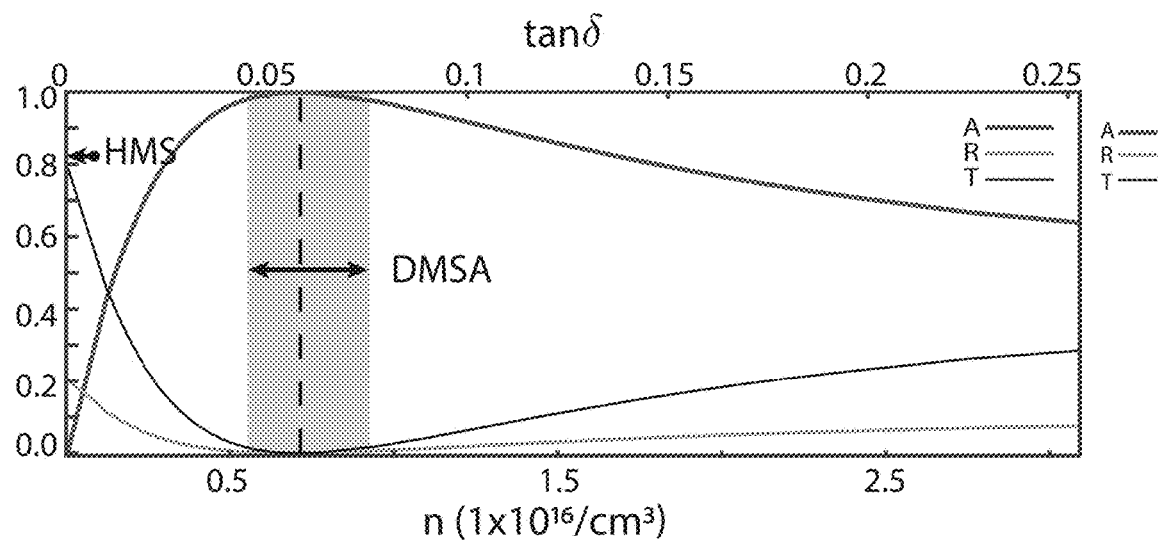
Figure 24B:
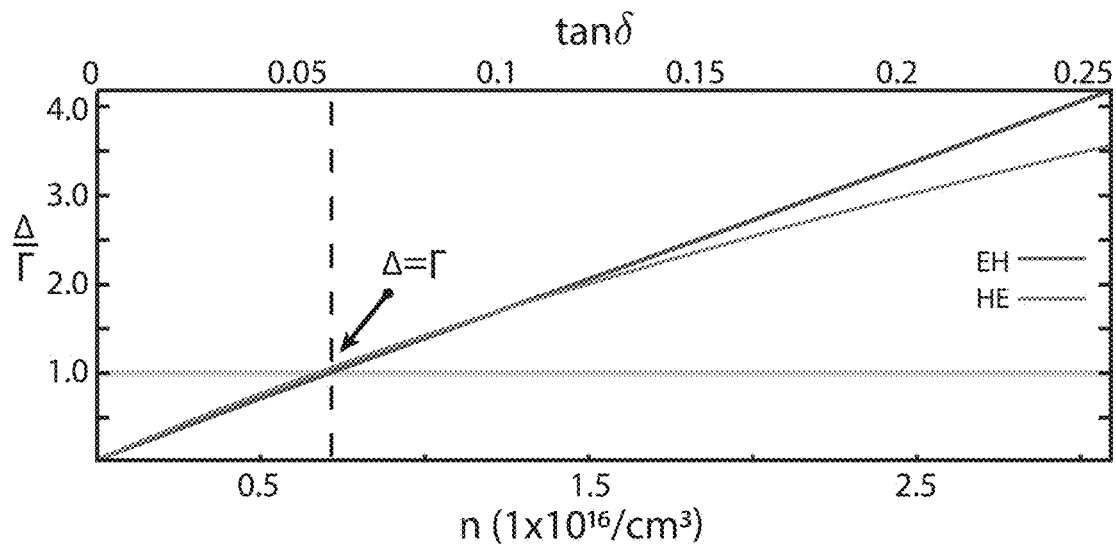

Having thus described the presently disclosed subject matter in general terms, reference will now be made to the accompanying Drawings, which are not necessarily drawn to scale, and wherein:

FIG. 1A is a perspective view of one example absorber among an array of dielectric metamaterial absorbers in accordance with embodiments of the present disclosure;

FIG. 1B is a graph showing the numerically simulated reflectance, transmittance, and absorbance of the resonant structure shown in FIG. 1A;

FIG. 2A is a perspective view of another example absorber among an array of dielectric metamaterial absorbers in accordance with embodiments of the present disclosure;

FIG. 2B is a graph showing the numerically simulated reflectance, transmittance, and absorbance of the resonant structure shown in FIG. 2A;

FIG. 3 is a graph showing a numerical simulation of the temperature distribution over a 5×5 cylinder array with a plane wave incidence;

FIG. 4 is a perspective image of another example absorber among an array of dielectric metamaterial absorbers in accordance with embodiments of the present disclosure;

FIGS. 5A and 5B are perspective views of example stacked arrangements of two example absorbers among an array of other absorbers in accordance with embodiments of the present disclosure;

FIGS. 6A-6D are graphs showing dependence of absorbance for $HE_{111}$ and $EH_{111}$ cylindrical modes as a function of geometrical parameters;

FIG. 7A illustrates a graph showing simulated spectral reflectance, transmittance, and absorbance;

FIG. 7B illustrates a mapping of the electric field in the xz-plane (right half) and the magnetic field in the yz-plane (left half) (both shown at the same phase and resonant frequency) of the absorber and substrate cell;

FIG. 8A is a graph showing measured reflectance, transmittance, and absorbance;

FIG. 8B is a graph showing simulated and measured absorbance;

FIG. 8C is an SEM image of the patterned SOI sample via deep reactive ion etching;

FIG. 8D is a graph showing simulated absorbance of a substrate free dielectric metasurface;

FIG. 9A is a cross-sectional view of the simulated electric field distribution in a plane normal to the y-axis at the center of the disk;

FIG. 9B is a cross sectional view of the simulated magnetic field distribution in a plane normal to the x-axis, at the center of the disk;

FIG. 9C is a top view of the simulated electric field distribution at a plane inside the disk, normal to the z-axis, and 11.76 μm from the bottom of the disk;

FIG. 9D is a top view of a simulated magnetic field distribution (same plane as FIG. 9C);

FIG. 10A is a graph showing simulated reference, transmittance, and absorbance of 50 μm thick Boron-doped silicon;

FIG. 10B is a graph showing absorption coefficient and imaginary part of refractive index of both bulk silicon and metasurface;

FIG. 11A is a graph showing calculated and simulated radius as a function of dielectric constant;

FIG. 11B is a graph showing calculated and simulated height as a function of dielectric constant;

FIG. 12A is an SEM image of an example fabricated cylinder array before substrate transfer in accordance with embodiments of the present disclosure;

FIG. 12B is an oblique view of the transferred cylinders in accordance with embodiments of the present disclosure;

FIG. 12C is a graph showing measured reflectance, transmittance, and absorbance of the dielectric absorber;

FIG. 12D is a graph showing numerically simulated reflectance, transmittance, and absorbance;

FIG. 13A is a diagram of an example imaging system in accordance with embodiments of the present disclosure;

FIG. 13B is a 3D plot (offset by 3 K) of the relative temperature profile of the focused THz beam on the all-dielectric absorber capture by the IR camera of the system shown in FIG. 13A;

FIG. 13C illustrates a diagram of an example bolometric camera configured for operation with an absorber in accordance with embodiments;

FIG. 14A is a graph showing the peak-to-peak temperature change as a function of frequency;

FIG. 14B is a graph showing normalized thermal response versus the modulation frequency of the source;

FIG. 15A is a false-grayscale THz image of a "D" letter object having a linewidth of 5 mm;

FIG. 15B is a false-grayscale image of a "smiley face" object with a smallest feature size of 5 mm;

FIGS. 16A and 16B are graphs showing experimentally measured transmission coefficient for different values of the optical fluence;

FIGS. 17A and 17B are graphs showing the simulated transmission amplitude and phase, respectively, as a function of fluence;

FIG. 17C is a graph of the simulated absorptivity of the arrayed all-dielectric cylinders with different photodoping fluence;

FIG. 17D is a graph showing the transmission amplitude and transmitted phase at 1.04 THz as a function of photodoping fluence (bottom axis) and the corresponding carrier density (top axis);

FIGS. 18A-18D show graphs of simulated even-mode and odd-mode absorption for top-layer doped and side-wall doped all-dielectric metasurface using two-port eigen-excitation method;

FIGS. 19A and 19B are graphs showing simulated eigen-frequencies of the even (square) and odd (triangle) modes for a square array of dielectric cylinders with top layer photodoping;

FIG. 20A illustrates a schematic of the metasurface with incident THz pulse;

FIG. 20B is an image of a fabricated sample on 23 μm PDMS substrate;

FIGS. 20C and 20D are graphs showing simulated transmission and absorption, respectively, for values of loss ranging from tan δ=0.0001 to tan δ=0.0582;

FIGS. 21A-21D are graphs showing scattering and loss with experimental (solid lines) and simulated (dashed lines) results for four cases of dielectric loss;

FIGS. 22A-22D are surface plots showing frequency dependent material constants as a function of dielectric loss;

FIGS. 23A-23D are graphs of effective material modeling for four cases of plane wave propagation in linear homogeneous media, corresponding the value of dielectric loss in silicon indicated in the legend; and FIGS. 24A and 24B are graphs showing scattering at resonance.

SUMMARY

The present subject matter discloses imaging devices including dielectric metamaterial absorbers and related methods. According to an aspect, an imaging device includes a support. The imaging device also includes multiple dielectric metamaterial absorbers attached to the support. Each absorber includes one or more dielectric resonators configured to generate and emit thermal heat upon receipt of electromagnetic energy.

DETAILED DESCRIPTION

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure is illustrated herein, being contemplated as would normally occur to one skilled in the art to which the disclosure relates.

Articles "a" and "an" are used herein to refer to one or more than one (i.e., at least one) of the grammatical object of the article. By way of example, "an element" means at least one element and can include more than one element.

"About" is used to provide flexibility to a numerical range endpoint providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. Embodiments recited as "including," "comprising," or "having" certain elements are also contemplated as "consisting essentially of" and "consisting of" those certain elements.

Recitation of ranges of values herein are merely intended to serve as a shorthand method of referring individually to each separate value falling within the range, unless otherwise-Indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

Disclosed herein in accordance with embodiments of the present disclosure are THz, all-dielectric metasurface absorbers based on hybrid dielectric waveguide resonances. The metasurface geometry can be tuned in order to overlap electric and magnetic dipole resonances at the same frequency, thus achieving an experimental absorption of about 97.5%. A simulated dielectric metasurface, as disclosed herein, can achieve a total absorption coefficient enhancement factor of 140, with a small absorption volume. Experimental results described herein are well described by theory and simulations and are not limited to the THz range, but may be extended to microwave, infrared, and optical frequencies. Metasurface absorbers disclosed herein offer a new route for control of emission and absorption of electromagnetic radiation from surfaces with example applications in energy harvesting, imaging, and sensing.

In accordance with embodiments of the present disclosure, an imaging device includes a support, such as a thin substrate. The imaging device also includes multiple, dielectric metamaterial absorbers attached to the support. Each absorber has one or more dielectric resonators that can generate thermal heat upon receipt of electromagnetic energy.

In accordance with embodiments, an imaging device is provided that is based on an all-dielectric metamaterial absorber that can efficiently convert incident electromagnetic energy into thermal heat. The thermal energy from the dielectric resonator array may be transferred onto an ultra-thin substrate with very low thermal conductivity, so the converted heat is localized in the substrate. The significantly increased temperature can be detected by an infrared camera. Subwavelength dielectric resonators can be scaled over the electromagnetic spectrum from microwave wavelengths to optical wavelengths without complicated circuit designs as in CMOS-based terahertz detectors.

An example advantage of systems and devices provided herein is the provision of millimeter-wave and terahertz imaging with a low cost and simple system configurable without cooling components. An example design scheme provided herein separates the detection and imaging processes into two parts. In one part, a metamaterial-based absorber can provide terahertz detection. Also, an infrared camera can capture infrared imaging. Another example advantage of the present disclosure is that it may be easily scaled to other frequency ranges, such as the microwave and infrared, without changing configurations of the detection system, thereby lowering the designing cost.

In some embodiments, an all-dielectric absorber can include dielectric resonators supported by an ultra-thin substrate with very low thermal conductivity. The dielectric resonators can be any suitable shape, such as sphere, cone, rectangle, etc. For example, the absorber may have a cylindrical shape. In some embodiments, the dielectric cylindrical resonators can be described as waveguides where the effective magnetic ($HE_{11\delta}$) and electric ($EH_{11\delta}$) dipole modes can be effectively tuned by varying the dimensions. Impedance matching is achieved by merging both the resonance frequencies and amplitude response of the $HE_{11\delta}$ and $EH_{11\delta}$ modes. In addition, the absorption of the structure can be significantly enhanced and can reach near unity even though the dielectric material may be only slightly glossy.

In embodiments, the support may be made of a material that is not a substrate. This may not be necessary to achieve perfect absorption. In the case of a substrate support, the material of the substrate should be low loss in the terahertz range. The majority of the incident power may be dissipated within the dielectric resonators with only a negligible portion absorbed in the substrate. With such a configuration, the incidence of the terahertz wave can be bi-directional, i.e., from either side of the substrate.

FIG. 1A illustrates a perspective view of one example absorber 100 among an array of dielectric metamaterial absorbers in accordance with embodiments of the present disclosure. In this example, the absorber 100 is cylindrically shaped and lightly doped silicon. The absorber 100 is attached to a substrate support 102 having low loss in the terahertz range. In an example, the substrate may be made of a material with low thermal conductivity, such as polyimide, poly polydimethylsiloxane, aerogel, foam, polytetrafluoroethylene, poly(methyl methacrylate), or the like. The size of the absorber 100 can be based on the operating wavelength and dielectric constant of absorber material. In this example, the substrate support 102 is a thin film of poly-di-methyl-siloxane (PDMS) with the thickness about 1-10 microns to reduce the thermal mass of the support. FIG. 1B is a graph showing the numerically simulated reflectance, transmittance, and absorbance of the resonant structure shown in FIG. 1A. At the resonant frequency of about 600 GHz, near unity absorbance is achieved. As noted above, the designed absorption can be scaled by modifying the resonator structures and dielectric materials of resonators over the electromagnetic spectrum.

FIG. 2A illustrates a perspective view of another example absorber 100 among an array of dielectric metamaterial absorbers in accordance with embodiments of the present disclosure. In this example, the absorber 100 is cubically shaped and lightly doped silicon. The absorber 100 is attached to a substrate support 102 having low loss in the terahertz range. In this example, the substrate support 102 is a thin film of poly-di-methyl-siloxane (PDMS). FIG. 2B is a graph showing the numerically simulated reflectance, transmittance, and absorbance of the resonant structure shown in FIG. 2D. This graph shows excellent absorption in the terahertz ranges. To realize a broadband absorber, it is possible to stack different dielectric resonators vertically or arrange those laterally in a mosaic.

For terahertz imaging, a suitable terahertz source can be used, including continuous-wave and ultrafast terahertz emitters. As the incident electromagnetic wave from the front side is dissipated in the absorber, the energy can be converted to thermal heat, thus increasing the temperature of the resonators. Subsequently, the generated heat can quickly conductively transfer to the substrate.

The special resolution of the imaging may be limited by the thermal diffusivity of the substrate, which is proportional to the thermal conductivity and inversely proportional to the thermal capacity and material density. The selection of polymer substrate allows the diffusivity two orders smaller than metallic ground plane based absorbers. Therefore, the transferred heat may be significantly localized in a small area around the cylindrical resonator. Another important factor for the thermal imaging is the emissivity of the substrate, which may be as high as possible in the range compatible to the thermal detection (spectral window of 8-14 µm). Here, a PDMS substrate is used as a demonstration. There are many other materials satisfying these requirements, such as polyimide, foam, aerogel, ceramics, and the like. Because of the high thermal radiation from the substrate, the heated patterned can be captured by an infrared camera easily. FIG. 3 is a graph showing a numerical simulation of the temperature distribution over a 5×5 cylinder array with a plane wave incidence. It is clear that the temperature increase is mainly localized in the center area. The inset of FIG. 3 shows the temperature distribution after the 5 by 5 absorber array is heated by the terahertz waves.

In accordance with embodiments, absorbers may have any suitable shape, size, and arrangement. As an example, an absorber may be shaped as a cone, a parabolic shape, an extruded cross, or a cubical shape. FIG. 4 illustrates a perspective image of another example absorber 100 among an array of dielectric metamaterial absorbers in accordance with embodiments of the present disclosure. In the example of FIG. 4, the absorber 100 is cubically-shaped and attached to the substrate 102. The absorber 100 has an aperture 400 defines therein. Further, for example, multiple absorbers may be arranged as an array on a surface of a support, such as a substrate. The heights and diameters of the absorbers can be dependent on the operational wavelength and dielectric constant of materials used for absorbers. For a silicon-based absorber designed in the range of about 600 GHz to about 1000 GHz, the height is between about 50 microns and about 85 microns, while the diameter is about 120 microns to about 212 microns.

In accordance with embodiments, an absorber on a support may be positioned at about the same distance from its neighboring absorber. An example distance range between neighboring absorbers is about 118 microns for the silicon absorber with absorption peak at about 600 GHz.

Each unit cell in the array may be the same or approximately the same. However, it is noted that the cells may be different. Different structures may be utilized and interleaved to provide desired terahertz absorption characteristics. One example of this interleave is to arrange in a checkerboard fashion unit cells A and B, so that the overall absorption approaches the sum of the absorption of both unit cells. This may be utilized to broaden the bandwidth of the absorber or allow the absorber to function efficiently at two different terahertz frequencies. Other interleaving designs and increased number of cell variants can also be utilized. In accordance with embodiments, absorbers on a support may be made of different materials and different shapes from each other. For example, some absorbers on a support may be cylindrically-shaped, and other absorbers may be cubically-shaped.

The absorber structures can be made by sintering, etching process, deposition, or other suitable technique. In an example, silicon or other semiconductors, reactive ion etching can be used to directly pattern the absorber structures after photolithography process. The support material can be prepared from curing polymer gel after spin-coating on a glass slide. Before curing, the absorber structures may be transferred to the polymer layer. Subsequent to curing, the polymer layer including the absorber structures can be peeled off from the glass slide.

In accordance with embodiments, absorbers may be made of any suitable material. Example semiconductors include, but are not limited to, Silicon, Gallium Arsenide, Germanium, and Indium Phosphide. Example insulators include, but are not limited to, ceramics such as Zirconium Dioxide, diamond, Silicon Nitride, Barium Strontium Titanate, and Titanium Dioxide.

In accordance with embodiments, absorbers may be stacked on one another on a support. FIGS. 5A and 5B illustrate perspective images of example stacked arrangements 500 of two example absorbers 502 and 504 among an array of other absorbers in accordance with embodiments of the present disclosure. In these 2 different examples of FIGS. 5A and 5B, absorber 502 is stacked on top of absorber 504. In the example of FIG. 5A, absorber 502 is cylindrically-shaped, and absorber 504 is conically-shaped. In the example of FIG. 5B, absorber 502 is cylindrically-shaped, and absorber 504 is cylindrically-shaped and larger than absorber 502. Absorber 504 is attached to the substrate 102. A stacked structure can exhibit dual-band or multiple band absorption. FIG. 5A shows an example of dual-band absorber with one small cylinder stacked on a big one.

In accordance with embodiments, absorbers and their support may be contained within a vacuum or near-vacuum. One example implementation of this is by enclosing the entire absorber in a small hermetic vacuum chamber with infrared- and terahertz-transparent windows mounted on each side. The terahertz-transparent window may also be integrated with the infrared filter. The vacuum pressure may be several orders smaller than that in atmosphere, i.e., in the range of mTorr or even lower.

In accordance with embodiments, a camera may be configured to capture an image generated by the absorbers. The captured image may be an infrared image, a microwave image, an optical image, or other suitable image. As the absorber dissipated all or nearly all of the incoming terahertz energy into heat, the support material with large infrared emissivity can convert the increased temperature into thermal radiation such that the infrared camera can detect, thus directly capturing the thermal image generated from the terahertz absorber.

Now a description is provided of the nature of hybrid modes. The hybrid modes are waveguide modes with non-zero electric and magnetic fields in the direction of propagation, which are different from other waveguide modes, like TEM, TE and TM modes. They may be supported by a dielectric cylinder when the k-vector lies parallel to the cylindrical axis (z-axis). A notation for two hybrid mode groups is HE and EH, where $H_z/E_z \ll 1$ for the HE mode and $E_z/H_z \ll 1$ for the EH mode. Thus, the EH mode is TE-like since $H_z$ is dominant, and HE is TM-like since $E_z$ is dominant. In order to denote the field variation within the cylinder, three indices are added, i.e. $HE_{nml}$ and $EH_{nml}$. Here n indicates the azimuthal variation of the fields and is of the form $\sin n\phi$ and $\cos n\phi$, m denotes the field variation along the radial direction, and l along the z-axis. It is noted that when the length of the guide is not relevant, and only the azimuthal and radial modes are considered, $\delta$ is used in place of the l-index.

A highly absorbing state can be achieved by utilizing the lowest order magnetic dipole ($HE_{11\delta}$) and electric dipole ($EH_{11\delta}$) modes of the cylindrical dielectric waveguide. For a single (isolated) dielectric cylindrical waveguide, the $HE_{11\delta}$ and $HE_{11\delta}$ modes may not possess the same resonant frequency. Notably, the HE mode has zero cutoff and thus may lie at much lower frequencies than the EH mode. Through an understanding of the underlying mechanism responsible for occurrence of the two hybrid modes, a cylindrical geometry may be used to optimize their frequency overlap. It may be assumed that the k-vector of external radiation may be incident parallel to the cylindrical axis—and to the surface normal of the supporting substrate—of an all-dielectric metasurface as disclosed herein, and thus only hybrid modes may be excited.

Next, the minimum height and radius of a dielectric cylinder absorber that supports both electric and magnetic dipole-like hybrid resonant modes at some target frequency $\omega_0$ may be calculated. A goal may be to achieve a sub-wavelength all dielectric metasurface which realizes high absorption with minimal scattering. High dielectric materials may be utilized such that the individual cylindrical resonators are small—in all dimensions—with respect to the incident wavelength. For a material with a high relative constant $\in_r$ and for a target frequency with maximum absorptivity of $A(\omega_0)$, the wavelength in the guide may be, $$\lambda_0 = \frac{\lambda_0}{\sqrt{\in_r}} = \frac{2\pi}{\omega_0} \frac{c}{\sqrt{\in_r}}. \tag{1}$$

The desired minimum height h of the guide can support the l=1 lowest order mode, and thus can be approximated as half-wave dipole with, $$h = \frac{\lambda_g}{2}. \tag{2}$$

Although the $HE_{11\delta}$ mode exists to zero frequency, the EH mode can have a cutoff determined by the radius and dielectric constant of the waveguide. The cutoff radius of a dielectric cylinder that can support the lowest order $EH_{11\delta}$ hybrid mode can be calculated. It is noted that although some portion of the wave may lie outside the guide, the majority of the energy is desired to be contained within the boundary of the cylinder. Thus, the radial k-vector ($k_r$) can be constrained such that the wave undergoes total internal reflection (TIR) inside the cylindrical waveguide. For a guide embedded in vacuum the condition of TIR—in terms of radial wavevector—is then, $$k_r = k_g\sqrt{1 - \frac{1}{\epsilon_r}}. \quad (3)$$

where the wavevector in the guide is given by $k_g = 2\pi/\lambda_g$. The condition placed on $k_r$ is used to determine the cutoff radius of the waveguide, which may be found by noting that the solutions to the boundary conditions for modes within the cylinder are determined by roots of the Bessel function of the first kind, i.e., $J_1(k_r r) = 0$, were r is the radius of the cylinder. Again, a minimum size of the dielectric surface is desired, thus the argument of $J_1$ can be solved which yields the first nontrivial zero—a value of 3.83. The cutoff radius can be determined by, $$r = \frac{3.83}{k_r}. \quad (4)$$

For experimental realization of the all-dielectric metasurface absorber, a boron doped as silicon can be chosen as the guide material since it realizes a relatively high dielectric value $\epsilon_{Si} = 11.0$ with moderate loss at THz frequencies. A target frequency of 1.0 THz may be chosen, and thus, using the aforementioned equations (1)-(4), the dimensions of the cylindrical waveguide can be calculated—ignoring the host substrate—to have a height of $h_{Si} = 45$ μm and a radius of $r_{Si} = 58$ μm. Although it can be expected an all-dielectric metasurface with the above calculated dimensions to yield high absorption, the absorptance for values far away from optimal may be simulated in order to study the individual hybrid modes and their dependence on geometry.

Figure 6A:
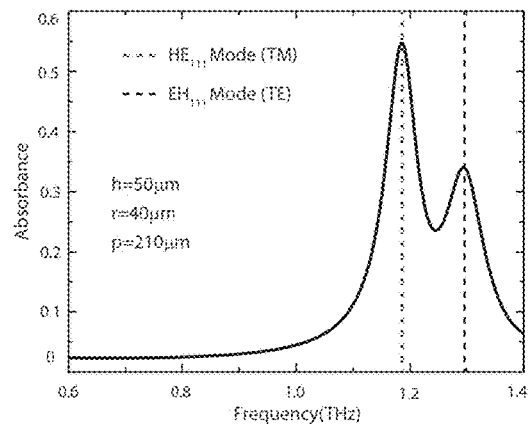
Figure 6B:
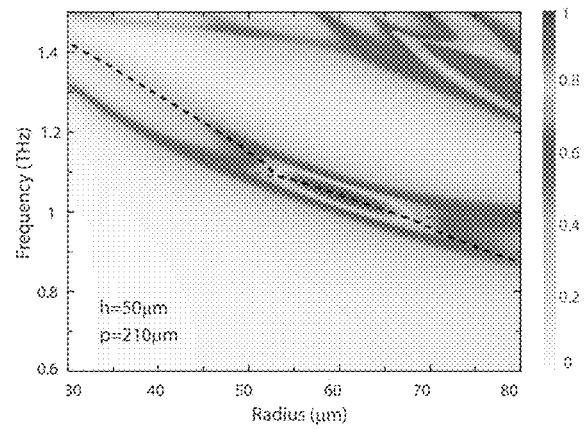
Figure 6C:
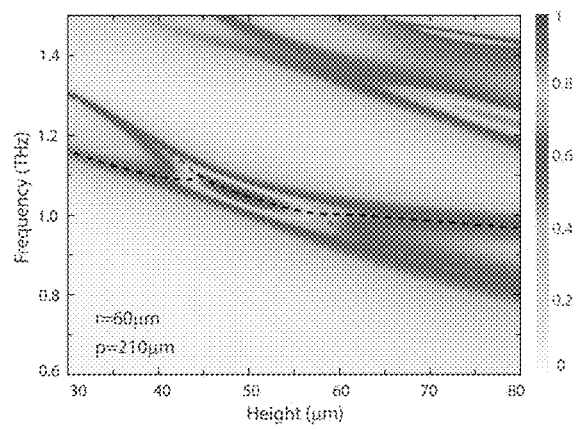
Figure 6D:
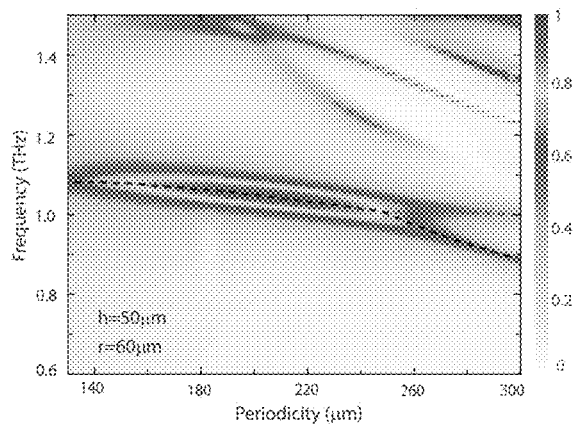

FIGS. 6A-6D are graphs showing dependence of absorbance for $HE_{111}$ (gray dashed curves) and $EH_{111}$ (black dashed curves) cylindrical modes as a function of geometrical parameters. Particularly, FIG. 6A shows the simulated frequency dependent absorbance with dimensions of height h=50 μm, radius r=40 μm, and a periodicity of p=210 μm. The first absorption peak at 1.186 THz results from the magnetic dipole resonance and the second peak at 1.294 THz is due to the electric dipole resonance. FIG. 6B shows dependence of the absorbance on frequency and radius with h=50 μm and p=210 μm, plotted as a grayscale map (see grayscale bar). FIG. 6C shows dependence of the absorbance on frequency and height with r=60 μm and p=210 μm. FIG. 6D shows dependence of the absorbance on frequency and periodicity with h=50 μm and r=60 μm.

In FIG. 6A, it is shown that the absorbance as $A(\omega) = 1 - R(\omega) - T(\omega)$—for a 2D array of cylinders (substrate not included) with a radius of r=40 μm, a height of h=50 μm, and a pitch of p=210 μm. At these dimensions, simulation indicates two peaks in the absorption—over the frequency range investigated—at 1.186 THz and 1.294 THz. It may be found that the lower frequency peak (indicated by the dashed vertical gray line) is due to the magnetic dipole resonance ($HE_{111}$), while the higher energy peak (dashed vertical black line) is due to the electric dipole resonance $EH_{111}$. In order to investigate the specific dependence of the lowest order HE and EH modes on geometry, while keeping all other parameters fixed, the spectral absorbance as a function of the silicon disk radius from 30 μm to 80 μm was simulated, while keeping all other parameters fixed. In FIG. 6B, a grayscale map of the absorbance as a function of both frequency and radius was plotted. It can be observed that as the radius increases, both the electric (dashed black curve) and magnetic (dashed gray curve) dipole modes shift to lower frequencies. Also, simulations reveal that the electric mode is more sensitive to radius which results in a merging of the resonant frequencies as the radius of the disk is increased. It was found that near a radius of 60 μm, a highly absorptive mode occurs due to overlap of electric and magnetic resonant frequencies at approximately 1.1 THz. The dependence of HE and EH modes as a function of height is shown in FIG. 6C and periodicity in FIG. 6D. The frequency of peak absorbance as a function of height is shown in FIG. 6C and periodicity in FIG. 6D. The frequency of peak absorbance as a function of height yields a similar dependence as to that of values, the fields fall off rapidly outside of the waveguide. It was found that $A(\omega_0)$ is relatively independent of periodicity and remains large, except for low p values where nearest neighbor interactions become significant, and for $p \geq \lambda_0$, where periodicity scattering becomes important.

Simulation results presented in FIGS. 6A-6D verify the feasibility of achieving high absorption with an array of cylindrical metasurfaces. A substrate may be incorporated into simulations. A PDMS may be used as a substrate material owing to its low dielectric loss and low thermal conductance. Guided by Equations 1-4 and simulation results shown in FIGS. 1A-1D, cylindrical dimensions of $h_{Si} = 50$ μm and $r_{Si} = 62.5$ μm, with a periodicity of p=172 μm.

FIG. 7A illustrates a graph showing simulated spectral reflectance (line 700), transmittance (line 702), and absorbance (line 704). The inset plot of FIG. 7A shows the unit cell geometry in accordance with embodiments of the present disclosure, where r=62.5 μm, p=172 μm, h=50 μm, and t=35 μm. FIG. 7B illustrates a mapping of the electric field in the xz-plane (right half) and the magnetic field in the yz-plane (left half) (both shown at the same phase and resonant frequency) of the absorber and substrate cell. In FIG. 7A, the graph shows the simulated spectral dependence of the reflectance (line 700), transmittance (line 702), and absorbance (line 704). As is evident from FIG. 7A, just above 1 THz both T and R acquire values near zero and thus simulation indicates that the all-dielectric metasurface achieves a sharp absorption peak at 1.02 THz with a value of A=93.8%. In order to understand the impact of the asymmetry due to the substrate on the hybrid modes, the electric and magnetic field distributions were investigated at $\omega_0$. In FIG. 7A, the electric filed in the xz-plane and the magnetic field in the yz-plane were plotted at the resonant frequency of 1.02 THz. Fields shown in FIG. 7B are plotted at the same phase, and it is found that they are strongly localized within the dielectric metasurface, with a small portion lying outside.

In accordance with embodiments, a dielectric metasurface may be fabricated of 50-μm thick Boron doped silicon on insulator (SOI) substrate or any other suitable substrate. In an example, a Bosch process may be used to pattern the device layer to form an array of silicon disks. A scanning electron microscopy (SEM) image of the patterns SOI sample is shown in FIG. 8C, which depicts the patterns SOI sample via deep reactive ion etching (view angle is 45 degrees). The inset image of FIG. 8C shows the final fabricated sample. The buried 2-μm oxide layer was etched by 49% Hydrofluoric acid to make enough undercut for the following releasing process. Subsequently, a 35 μm thick PDMS was spin-coated on a second silicon substrate. The patterned SOI sample was flipped and bonded to the PDMS film by curing at 80 degrees C.

In an example of fabricating a dielectric metasurface, a 50-μm thick Boron doped SOI substrate may be utilized. A Bosch process was used to pattern the device layer to form an array of silicon disks. FIG. 8A is a graph showing measured reflectance (line 800), transmittance (line 802), and absorbance (line 804). FIG. 8B is a graph showing simulated and measured absorbance. The inset of FIG. 8B shows the power loss density distribution in cross section. FIG. 8C is an SEM image of the patterned SOI sample via deep reactive ion etching (view angle is 45 degrees). The inset image of FIG. 8C shows the final fabricated sample. FIG. 8D is a graph showing simulated absorbance of a substrate free dielectric metasurface which achieves A(1.05 THz)=99.6% and has dimensions of h=50 μm, r=60 μm, and p=210 μm. The inset of FIG. 8D shows a cross sectional view of the power loss density. The buried 2-μm oxide layer was etched by 49% Hydrofluoric acid to make enough undercut for the following releasing process. Subsequently, a 35 μm thick PDMS was spin-coated on a second silicon substrate. The patterned SOI sample was flipped and bonded to the PDMS film by curing at 80 degrees C. for 2 hours. The top SOI handle substrate was subsequently stripped off through application of a lateral force. Subsequently, the released silicon on the 35-μm PDMS was bonded to a free-standing thick PDMS frame (see inset of FIG. 8C).

The spectral transmittance and reflectance of the fabricated sample was characterized with THz time domain spectroscopy (TDS) system. The sample was placed at the focal plane for both reflectance and transmittance setups, and the TDS system was purged with nitrogen gas during the measurement. The absolute reflectance was obtained by referencing measurements with respect to a gold mirror and were made at normal incidence using a beam splitter configuration. Absolute transmittance measurements used an open aperture as a reference and were performed at normal incidence. The measured reflectance (R), transmittance (T), and absorbance (A) are shown in FIG. 8A and a peak absorption of A=97.5% at 1.011 THz is realized. In FIG. 8B, both experimental and simulated A(ω) were plotted. Good agreement is evident and the slight difference is due to scattering from the periodic metasurface and surface roughness of the fabricated sample, which is not taken into account in simulation.

The dipole modes supported by the dielectric cylindrical metasurface extend beyond their surfaces and are thus affected by materials in the surrounding environment. In the inset of FIG. 8B, the spatial distribution of power loss density is shown in the xz-plane. As can be observed, although the supporting substrate breaks the symmetry, the majority of the power is still dissipated within the silicon metasurface, and only a tiny portion persists in the substrate. However, in order to verify the ability of the all-dielectric metasurface to function as a high absorber of radiation, a substrate free simulation and plot A(ω) and the power loss density were performed and the results shown in FIG. 8D. Simulation reveals that a peak absorbance of A=99.6% can be achieved at a frequency of 1.05 THz.

The simulated substrate-free metasurface is moderately sub-wavelength and realizes a free space wavelength to particle diameter of $\lambda_g/2r=2.4$. The ability of metamaterials and metasurfaces to manipulate electromagnetic waves on sub-wavelength scales is an important example feature that permits realization of broad-band and wavelength specific absorptivity and emissivity. Like-wise the all-dielectric metasurface absorbers realized here permit the same high degree of tailorable emission and/or absorption of energy from a surface. Thus, in order to quantify the ability of the metasurface disclosed herein to absorb radiation on a sub-wavelength scale, an absorption coefficient (α) enhancement factor, $$F_\alpha = \frac{\alpha_{mm}}{\alpha_{Si}}. \qquad (5)$$

where $\alpha_{mm}$ and $\alpha_{Si}$ are the absorption coefficients of the metasurface and bulk silicon, respectively, at 1.05 THz. The doped silicon yields $\alpha_{Si}$=42 cm$^{-1}$, whereas the metasurface achieves $\alpha_{mm}$=1500 cm$^{-1}$. It was calculated that the simulated metasurface absorber shown in FIG. 8D achieves an absorption coefficient enhancement factor of $F_\alpha$=35. It is noted that for a bulk silicon layer with $\in_{Si}$=11.0, the limit is $F_\alpha$=4$n_{Si}^2$=4$\in_{Si}$=44. However, the dielectric metasurface absorber disclosed herein uses significantly less material volume, i.e., the filling fraction is F=πr$^2$/p$^2$=0.256. Strikingly, the metasurface realizes increased absorption in a reduced volume, and thus a total absorption coefficient enhancement factor was found to be, $$F_\gamma = \frac{\alpha_{mm}}{\alpha_{Si}} F^{-1} = 140. \qquad (6)$$

Thus, although various dielectric materials may function as absorbers, they utilize sizes large compared to the wavelength, and/or have a significant portion of absorption occurring within the support substrate.

Through optimizing the radius and height of absorbers, both electric and magnetic resonances can be achieved at the same frequency resulting in an impedance matched condition. To further understand how a free-standing silicon metasurface itself can be achieved near unity absorption, the field distributions at the resonant frequency and the results are show in FIGS. 9A-9D. FIG. 9A illustrates a cross-sectional view of the simulated electric field distribution in a plane normal to the y-axis at the center of the disk. FIG. 9B illustrates a cross sectional view of the simulated magnetic field distribution in a plane normal to the x-axis, at the center of the disk. FIG. 9C illustrates a top view of the simulated electric field distribution at a plane inside the disk, normal to the z-axis, and 11.76 μm from the bottom of the disk. FIG. 9D illustrates a top view of a simulated magnetic field distribution (same plane as FIG. 9C). According to these figures, at the resonance frequency both electric (FIGS. 9A and 9C) and magnetic (FIGS. 9B and 9D) dipole resonances are excited inside the cylinder and are polarized perpendicular with each other. As is evident in FIGS. 9A-9D, both the electric and magnetic fields are highly localized within the silicon disk.

In order to verify that the near unity absorption arises from the geometry of the metasurface particles, rather than the bulk material properties itself, the absorbance of the bare silicon film was investigated, while keeping the silicon film thickness the same as the cylinders. As shown in FIG. 10A, the maximum absorbance of the free-standing silicon film is 27.6% at 0.5 THz and decreases to only 14% around 1 THz, which is significantly lower than the near unity absorbance from the cylinders. In addition, the absorption coefficient of the free standing silicon metasurface was calculated from the imaginary part of its extracted refractive index of both the bulk silicon and the free-standing silicon metasurface as shown in FIG. 10B. FIG. 10A is a graph showing simulated reflectance (line 1000), transmittance (line 1002), and absorbance (line 1004) of 50 µm thick Boron-doped silicon. FIG. 10B is a graph showing absorption coefficient (α) and imaginary part of refractive index (Imag(n)) of both bulk silicon (line 1006) and metasurface (line 1008).

In accordance with embodiments, the radius and height of a dielectric cylindrical absorber may be designed based on the dielectric constant ($\epsilon_r$) of the cylinder and the resonant frequency. According to Equations (2)-(4), the height is:

$$h = \frac{\lambda_g}{2} = \frac{\lambda_0}{2}\epsilon_r^{-\frac{1}{2}} = \frac{c}{2f_0}\epsilon_r^{-\frac{1}{2}} \quad (7)$$

The radius is equal to:

$$r = \frac{3.83}{k_r} = \frac{3.83\lambda_g}{2\pi\sqrt{1-\frac{1}{\epsilon_r}}} = \frac{3.83\lambda_g}{2\pi}(\epsilon_r - 1)^{-\frac{1}{2}} = \frac{3.83c}{2\pi f_0}(\epsilon_r - 1)^{-\frac{1}{2}} \quad (8)$$

c is the speed of light in vacuum and $f_0$ is the target frequency. To show theoretical calculations generally work for metasurface absorber designs with different dielectric materials, the radius and height were calculated for designing a metasurface absorber at 1.0 THz with different dielectric constants, and compared with those from the simulations shown in FIGS. 11A and 11B. FIG. 11A is a graph showing calculated and simulated radius as a function of dielectric constant. The simulated results are fit with power law. FIG. 11B is a graph showing calculated and simulated height as a function of dielectric constant. The simulated results are fit with power law. The periodicity for both simulations were retained at 210 µm. In the simulation, the periodicity was kept fixed (p=210 µm), and the radius and height were varied with the dielectric constant. The calculated results are close to the simulations according to the simulations shown in FIGS. 11A and 11B. Some portion of the fields extend beyond the boundary of the cylindrical particles, and this field leakage results in deviation of the simulated radius from the theoretical calculations. Based on Equation (8), the simulations were fitted with power law: $\alpha(x-1)^{-1/2}$ and the curves are plotted as shown in FIG. 11A. The fitted curve for the radius matches well with the simulated results with the factor a=200.34 µm, and is only 8.7% different from the calculated factor of 3.83c/(2πf₀)=149.90 µm by 14.6%. As a result, the height and radius of the dielectric cylinders from the calculation are close to those from the simulation over a very broad range of dielectric constants.

In simulations, unit-cell boundary conditions were used, where any scattered radiation is collected by Port 1 (reflection) or Port 2 (transmission). Thus, in simulation, scattering enters into the reflectance ($R_{sim}$) and/or transmittance ($T_{sim}$), where $A_{sim}=1-R_{sim}-T_{sim}$. On the other hand, in experiment, the majority of scattered light does not make it back to the detector, and thus the reflectance ($R_{exp}$) and/or transmittance ($T_{exp}$) would be smaller. The end result is that $A_{exp}=1-R_{exp}-T_{exp}$ is larger than that in simulation. Thus, the scattering (S) may be equal to the difference between the experimental and simulated absorbance, i.e. $S=A_{exp}-A_{sim}$. For this case, the scattering calculated in this way would be S=97.5%−93.8%=3.7%.

A simulation was performed in order to gain more insight into the impact of scattering. A frequency domain simulation of the exact dielectric absorber structure shown in FIG. 7A was performed, and again found the peak absorbance to occur at a frequency of 1.02 THz with a value of A=93.8%. The simulation software uses a default emitted port power of 0.5 Watts for each frequency investigated, i.e. at 1.02 THz. Also, the distribution of power loss density was simulated and integrated over the dielectric absorber and support dielectric in order to obtain the total absorbed power. An integrated power loss was found to occur at 0.467 Watts within the material and host substrate. The absorbance can be calculated as $A_{power}=0.467/0.5=93.4\%$. Thus, an absorbance was found with a value that is only 0.4% different from the absorbance evaluated in simulation using $A_{sim}=1-R_{sim}-T_{sim}=93.8\%$. Although $A_{power} \cong A_{sim}$, it is noted that they are both unable to determine the amount of scattering. However, in FIG. 8A, $A_{sim}=99.6\%$ was obtained for geometrical parameters nearly equal to the case discussed herein above. Thus, since $A_{power} \cong A_{sim}$, the scattering must be negligible since the absorbance determined by power can account for 99.6% of all energy in the simulation, indicating that the scattering is at most 0.4% in this case.

It is noted that dielectric cylindrical resonators may be described as waveguides where effective hybrid magnetic ($HE_{111}$) and electric ($EH_{111}$) dipole modes may be tuned based on geometry. Impedance matching can be achieved by merging both the resonance frequency and amplitude response of the lowest-order $HE_{111}$ and $EH_{111}$ modes. For materials with relatively high dielectric constants ($\epsilon_r>10$), the surfaces can be approximated as perfect magnetic walls. Under these conditions, the dimensions of the dielectric resonator can be determined only by the resonance wavelength ($\lambda_0$) and refractive index (n) of cylinders. The HE magnetic dipole mode has no cutoff and exists for all frequencies for a given size. Thus, in order to obtain high absorption at a given frequency, an important criterion is to find the cutoff conditions for the EH mode. Prior studies have shown that for a cylindrical dielectric particle with an index of refraction of (n), radius (r), and height (h), the EH cutoff condition is given by:

$$r = 0.61 \frac{\lambda_0}{(n^2-1)^{1/2}}, \quad (9)$$

$$h = \frac{\lambda_0}{2n} \quad (10)$$

Due to the specifically designed geometry using Equations (9) and (10), the overlap of the magnetic dipole and electric dipole resonances is established—reaching near unity—although the bulk material only possesses relatively small loss.

As an example, silicon is used as the dielectric material, since it exhibits a relatively large dielectric value across the THz range, as well as the capability to achieve a variable loss tangent (tan δ) through doping. A target frequency of 600 GHz was chosen, and thus, Equations (9) and (10) predict dimensions of a diameter of D=193 µm and a height of h=75 µm. A support substrate may be used, and thus the optimal values determined by the numerical simulations may differ slightly, with D=207 µm and h=86.7 µm for silicon with material parameters of a plasma frequency of $\omega_p=2\pi\times0.69$ THz and a collision frequency of $\gamma=2\pi\times0.83$ THz. For the experimental implementation, an extremely thin sub-wavelength substrate was utilized to support the cylinder array, as shown in FIG. 1A. FIG. 12A is an SEM image of an example fabricated cylinder array before substrate transfer in accordance with embodiments of the present disclosure. The periodicity p is 330 µm, cylinder height is 85 µm, the radius is 106 µm, and the substrate thickness is 8 µm. The scale bar shown in FIG. 12A is 300 µm. FIG. 12B is an oblique view of the transferred cylinders in accordance with embodiments of the present disclosure. FIG. 12C is a graph showing measured reflectance, transmittance, and absorbance of the dielectric absorber. FIG. 12D is a graph showing numerically simulated reflectance, transmittance, and absorbance. Consideration of the conservation of energy allows for a description in increase in temperature of the metasurface as:

$$\Delta T = \frac{\varepsilon_m P_m}{\sqrt{G_T^2 + \omega^2 C^2}}, \quad (11)$$

where $\varepsilon_m$ is the emittance/absorbance of the metasurface, $P_m$ is the incident THz power modulated at a frequency of $\omega$, C is the heat capacity of the metasurface, and $G_T$ is the thermal conductance of the total power loss, consisting of convection, conduction, and radiation.

Since the composite metasurface in this example is supported by a substrate, its thermal properties should also be considered. The thermal diffusivity can determine how much the absorbed heat spreads in the substrate—thus limiting the spatial resolution—and may be described by $\alpha=\kappa/\rho c_p$, where $\kappa$ is the thermal conductivity, $\rho$ is the density of the material, and $c_p$ is the specific heat capacity. PDMS was selected as the support substrate, and it possesses suitable thermal diffusive properties, i.e., $\alpha$ is nearly five times smaller than that of polyimide.

An example imaging system in accordance with embodiments of the present disclosure is shown in FIG. 13A. The imaging system includes an array of absorbers 1300, an infrared camera 1302, an off-axis parabolic mirror (OAP1) 1304, an OAP mirror (OAP2) 1306, an infrared filter (IRF1) 1308, another infrared filter (IRF2) 1310, and a continuous-wave (CW) transmitter 1312. The imaging system can be used to image an object 1314. It is noted that the back side of the support substrate in this example is facing the infrared camera 1302. An important consideration is the substrate's IR emissivity, which may be large in order to achieve optimal imaging fidelity, i.e., maximize the image resolution while reducing noise. The PDMS realizes a relatively large average emissivity of approximately 75% between 8-13 µm.

The dielectric absorber was fabricated using an SOI wafer with an 85 µm device layer thickness. The resistivity of the n-type device layer is approximately 2.2 Ω-cm, as determined by a four-point probe measurement. The array was patterned by deep reactive ion etching (DRIE), resulting in cylinders with a diameter of 212 µm and a periodicity of 330 µm. The cylindrical array was then transferred to a free-standing 8 µm PDMS substrate supported by a 1-mm-thick PDMS frame. The total area of the metasurface is 64 mm², consisting of 24×24 cylinders. An oblique view of the cylinder array on PDMS is shown in FIG. 12B.

The transmittance $T(\omega)$ and reflectance $R(\omega)$ of the sample were characterized with a fiber-coupled THz-TDS system. Transmittance measurements were referenced to free space at normal incidence, while the reflectance—also at normal incidence—was normalized to a gold mirror using a beam-splitter configuration. In both the $T(\omega)$ and $R(\omega)$ measurements, the THz waves were incident on the cylinder side of the metasurface. The absorbance $A(\omega)$ characterized from both sides of the metasurface is nearly identical, owing to the low permittivity of PDMS in the THz range, as well as the sub-wavelength thickness $t\approx\lambda/62.5$. The measured $T(\omega)$, $R(\omega)$, and $A(\omega)$ from the cylinder side are shown in FIG. 12C, and the all-dielectric metasurface realizes a peak absorption of 96% at a frequency of approximately of $\omega_0=603$ GHz. FIG. 12D shows the simulation results, which obtain a good match to the experiment. The dielectric properties of PDMS were modeled with a permittivity of 1.72 and a loss tangent of 0.15 around 600 GHz. Simulation indicates that approximately 94% of the total absorbed power is dissipated within the silicon cylinders, even though the loss tangent of silicon is relatively small, i.e., tan $\delta_{Si}=0.06$ at $\omega_0$.

Having verified the highly absorptive properties of the all-dielectric absorber, next an experiment of THz imaging at room-temperature is conducted. The source in this example is a CW transmitter module with a tuning range from 580-620 GHz. The use of a 2.4 mm aperture diagonal horn antenna produces a Gaussian beam with a full 3-dB beamwidth of about 10 degrees. The imaging setup (shown in FIG. 13A) includes two OAP mirrors 1304 and 1306, which may be 5018 mm diameter 90 degree OAP mirrors. The CW transmitter 1312 may be placed at a focal point of the OAP mirror 1304, with an effective focal length of $f_{L1}=190.6$ mm, which produces a collimated Gaussian beam with a 3-dB diameter of 33 mm. The second OAP mirror 1306 ($f_{L2}=50.8$ mm) is placed about 550 mm away from the OAP mirror 1304 and forms a conjugate image on the dielectric absorber. A 75 µm thick black polyethylene sheet was used as an IR filter to block the thermal radiation from the source. The THz images formed on the metasurface are absorbed and converted to heat. Thus, in order to produce an image, an uncooled microbolometer IR camera with spatial resolution of 25 µm (FLIR T640sc) was used on the backside (PDMS substrate side) of the metasurface, thereby imaging the dissipated THz power.

The noise performance of the imaging system was characterized where all source power was focused into a diffraction spot on the metasurface and modulated at a frequency of 0.25 Hz. FIG. 13B is a 3D plot (offset by 3 K) of the relative temperature profile of the focused THz beam on the all-dielectric absorber capture by the IR camera of the system shown in FIG. 13A. The lines show a cross section of the temperature profiles across the peak. FIG. 13B shows the 3D and 2D temperature profiles obtained with the IR camera. A cross-section temperature profile across the center spot is shown in the 2D plane, and it can be observed that the peak temperature increase is about 5.4 K above the ambient temperature. The spot size at the full width at half-maximum (FWHM) is approximately 1 mm. The CW source produces a power of 2.1 mW at 603 GHz, and it was found that approximately half of the source power is incident on the metasurface absorber when all the losses of the system are accounted for. Thus, assuming a Gaussian beam profile, it was found that the power incident on the center unit cell to be 11.9% of the source power, i.e., 250 µW. The responsivity of the absorber can be determined as the increase in temperature per unit of the incident power such that the value of $2.16\times10^4$ K/W is found. Measuring the thermal response of a heated cylinder via the IR camera, the noise spectral density of the imaging system was found to be 18.0 mK/√Hz. This translates into an imaging system noise-equivalent power (NEP) of $8.3 \times 10^{-7}$ W/√Hz.

In accordance with embodiments, FIG. 13C illustrates a diagram of an example bolometric camera 1302 configured for operation with an absorber 1316. In this example, the camera 1302 includes an infrared camera 1318 that faces the absorber 1316 and an infrared lens 1320 for focusing received light on the infrared camera 1318. The camera 1302 is configured to receive Terahertz electromagnetic waves that pass through an object 1322 and an infrared filter 1324 and Terahertz windows 1326 mounted to the side of a vacuum box 1328. Components and the absorber 1316 are contained within the vacuum box 1328. The vacuum box 1328 may be a hermetic vacuum chamber.

FIGS. 14A and 14B highlight the dynamic and frequency-dependent properties of the all-dielectric metasurface absorber. FIG. 14A is a graph showing the peak-to-peak temperature change (see line 1400) as a function of frequency. The source power spectrum is plotted as line 1402. The measured absorbance of the metasurface is shown by the line 1404. FIG. 14A shows the frequency dependency of the CW source, which peaks at a frequency of approximately 615 GHz and maintains values above 90% over the range from 595 to 615 GHz. In this figure the normalized peak-to-peak temperature change $\Delta T_{pp}$ of the metasurface absorber is plotted while modulating the source. As can be observed, the relative source power determined by $\Delta T_{pp}$ matches the power of the source, although the absorber does exhibit some frequency dependence across the range shown. Further dynamic response measurements were performed via directly applying a modulation signal to the source.

FIG. 14B is a graph showing normalized thermal response versus the modulation frequency of the source. The inset shows the normalized temperature change on the absorber with a source modulation frequency of 1/16 Hz. From FIG. 14B, the rise time and fall time of the thermal response in the range of 10% to 90% of maximum modulated temperature are estimated to be about 1.4 and 0.4 seconds, respectively. The longer rise time is attributed to the forced heating process, which takes more time to be stable, while the faster fall time is led by the free cooling process. For comparison, the thermal response was also measured on a bare 8 μm PDMS thin film (not shown here). The average peak-to-peak temperature change observed in PDMS is only about 6% of the maximum temperature occurring within the dielectric absorber. This is comparable to the simulation results, which showed about 6% of the incident THz power was absorbed by the PDMS substrate. Due to the low thermal conductivity and the very thin layer of PDMS, the thermal conductance of the dielectric absorber is negligible and about two order of magnitude smaller than that of a metallic metasurface absorber with 400-nm-thick aluminum ground plane. As a result, the absorbed THz power is highly localized in the center region of the cylindrical array, consisting of about 3×3 cylinders. On the other hand, the device disclosed herein is not housed in a vacuum, and thus, the heat transfer is dominated by convective and radiative loss, leading to a response time longer than most commercial infrared bolometric detectors, in which the heat transfer is dominated by thermal conduction. The time constant of the absorber determined at the 3 dB point of the normalized temperature change is about 1 second, as shown in FIG. 14B.

Imaging experiments were performed with the setup depicted in FIG. 13A. The objects used for imaging included metallic apertures, each with a minimum feature size of 5 mm (see insets to FIGS. 15A and 15B), and were back-illuminated by the CW source. FIG. 15A is a false-grayscale THz image of a "D" letter object having a linewidth of 5 mm. FIG. 15B is a false-grayscale image of a "smiley face" object with a smallest feature size of 5 mm. The grayscale bar shows the relative temperature scale for both images. The object distance was $d_o$=500 mm, and a thin layer of black polyethylene was used as an IR filter (IRF2) and placed after the object. The image distance was $d_i$=56.5 mm, and thus, the imaging system had a magnification of M=–$d_i$/$d_o$=–0.11. A source frequency of 605 GHz and a power of 1.09 mW was used, which correspond to an average intensity of 4.4 mW/cm² at the imaging plane, i.e., on the metasurface absorber. The object minimum feature size of 5 mm was demagnified to a size of 565 μm at the image plane, which is approximately 1.7 times larger than the metasurface lattice parameter of 330 μm. However, the presently disclosed system operates close to the Rayleigh diffraction limit of 620 μm and uses OAP mirrors, thus producing slightly distorted images. The systems disclosed herein can be used to realize high image fidelity and an accurate reproduction of the original object. The peak image intensity is 0.3 K above the ambient temperature, as measured directly with the IR camera.

FIGS. 16A and 16B are graphs showing experimentally measured transmission coefficient for different values of the optical fluence. Line 1600 show the transmission coefficient without photoexcitation on the silicon metasurface. FIGS. 16A and 16B show transmission amplitude and transmission phase, respectively. The inset in FIG. 16B shows optical-pump (arrows indicated generally by 1602) and terahertz-probe beams (arrows indicated generally by 1604) incident onto the cylinders. The pump beam is incident at an angle of θ=20°. Both pump and probe beams are polarized in horizontal direction (TE). At 1.03 THz, the sharp resonance shows a transmission 0.01% and a rapid phase change from –165° to 180° is observed around $\omega_0$. Remarkably, with excitation of only a modest pump fluence of 10 μJ cm⁻², the transmission at 1.03 THz increases to 28%, and the minimum shifts to 1.07 THz, while the phase at ω=1.03 THz increases by about 90°. Upon further increase of the pump fluence to 35 μJ cm⁻², the transmission minimum further blue shifts to 1.12 THz, and the transmission amplitude at ω=1.03 THz increases to approximately 54%. At a maximum fluence of 140 μJ cm⁻², we find the resonant feature—determined by the transmission minimum—becomes saturated and weakly dependent on fluence, due to a large accumulation of carriers which serve to screen the incident THz radiation. However, a change could not be found in the transmitted phase—a value of approximately –42° at 1.03 THz.

In order to facilitate understanding of experimental results, full-wave electromagnetic simulations were performed. The effect of using an off-normal incident pump beam was modeled by modifying the conductivity of a segment of the top portion and half of the side wall of the cylindrical resonator, as depicted in the inset of the FIG. 17B. The thickness of the doped layer was determined using the penetration depth of 800-nm light in silicon, which is ~10 μm. The excited carrier density can be calculated by $$N = (1 - R_{Si}) f_{eff} \left( \frac{\alpha}{E_{ph}} + \frac{\beta(1 - R_{Si}) f_{eff}}{2 E_{ph} \tau} \right) \quad (12)$$

where $R_{Si}$ is the reflectivity of 800-nm light, τ=35 fs is the FWHM pulse width of the optical excitation, $f_{eff}$ is the incident fluence where we assumed a circular shape of the cross-section of the Gaussian beam, $E_{ph}$, is the photon energy of pump beam, $\alpha=1020$ cm$^{-1}$ is the linear absorption coefficient, and $\beta=6.8$ cm GW$^{-1}$ is the two-photon absorption coefficient parameter. Therefore, the maximum excited carrier density is approximately $3.8\times10^{17}$ cm$^{-3}$ for a fluence of 140 µJ cm$^{-2}$, which is still in the relatively low doping regime. The optical pump beam is incident at an angle of 20 degrees from the surface normal, and thus we find that the excited carrier density on the top layer is four times larger than that on the sidewall. For simplicity, the Drude model is utilized in order to describe the frequency and carrier density dependent permittivity, given as, $$\epsilon = \epsilon_\infty - \frac{\omega_p^2}{\omega^2 + i\omega\gamma_D} \quad (13)$$

where $\epsilon_{inf}=11.7$ is the static dielectric constant, $\gamma_D=10^{13}$ s$^{-1}$ is the Drude collision frequency, (determined by carrier-phonon collisions at low doping), $\omega_p=\sqrt{Ne^2/m_{opt}\epsilon_0}$ is the plasma frequency, N is the photoexcited carrier density calculated by Equation (12), $m_{opt}=0.16m_e$ is the optical effective mass of the carriers, and includes contributions from both electrons and holes. The contributions to hole doping from Boron are ignored, since the holes have a larger effective mass, and the contribution due to Boron is at least one-order of magnitude smaller than that due to optical excitation. FIGS. 17A-17D show simulated transmission amplitude and phase for various optical fluence. The inset in FIG. 17B shows the modeled photodoped cylinder structure. The shaded part of the cylinder indicated by reference 1704 indicates the photodoped region. The terahertz beam is polarized in the y direction. FIG. 17C is a graph of the simulated absorptivity of the arrayed all-dielectric cylinders with different photodoping fluence. FIG. 17D is a graph showing the transmission amplitude and transmitted phase at 1.04 THz as a function of photodoping fluence (bottom axis) and the corresponding carrier density (top axis). Solid curves are simulated results and symbols are experimental values. The insets in (d) are the power loss density with fluences of 0, 20 and 140 µJ cm$^{-2}$. FIGS. 17A and 17B are graphs showing the simulated transmission amplitude and phase, respectively, as a function of fluence. As is evident upon comparison of FIGS. 16A and 16B to FIGS. 17A and 17B, the simulated fluence dependent scattering results match the experimental results very well. In FIG. 17D, the graph shows the transmission (circles 1700) and phase (circles 1704) at 1.02 THz as a function of fluence. It is noted that both the transmission amplitude and phase increase and exhibit a strong fluence dependence up to approximately 35 µJ cm$^{-2}$, where upon they begin to saturate. Indeed, with further increase of the optical power, the doped silicon region becomes metallic, i.e. the real part of the permittivity is negative, such that the waveguide modes are strongly damped. The fluence dependent absorptivity were simulated, and results are shown in FIG. 17C. The absorption at $\omega_0$ drops from 97.5% in the undoped case, to ≈40% at the maximum optical fluence used in this study.

Figure 18A:
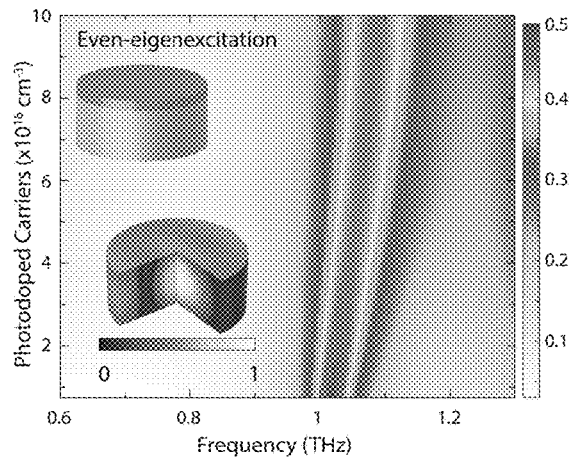
Figure 18B:
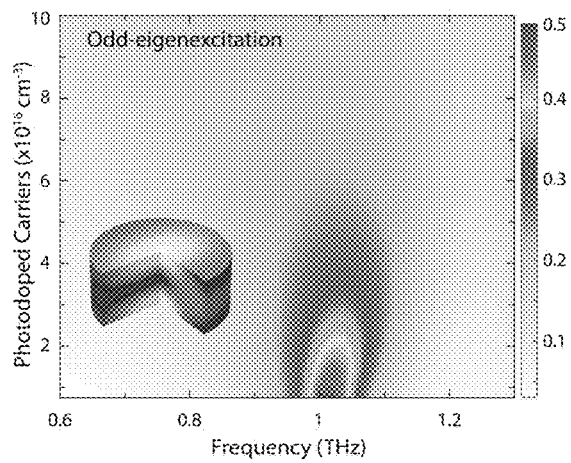
Figure 18C:
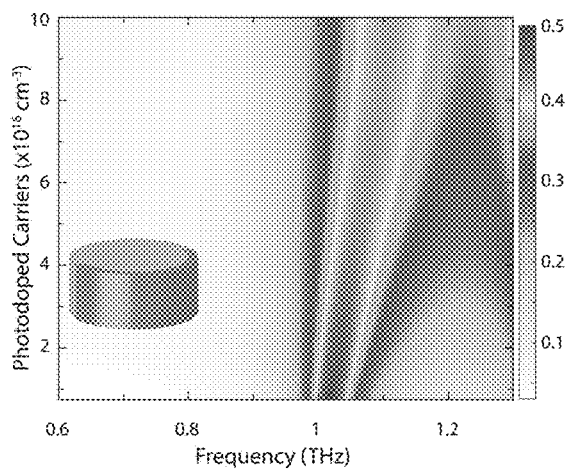
Figure 18D:
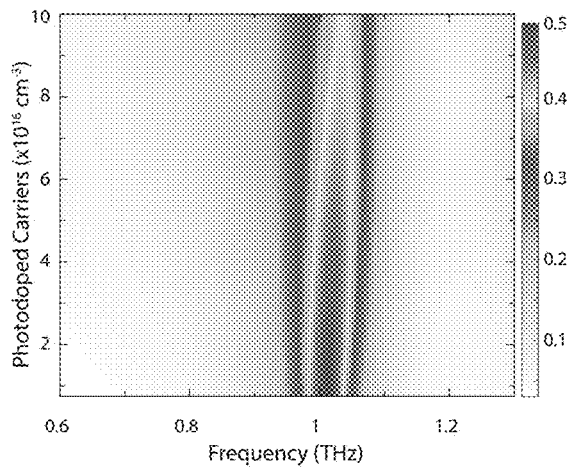

Two port S-parameter simulations and temporal coupled mode theory (TCMT) were utilized to elucidate the physics underlying the dynamical response. The absorbance of each eigenmode separately was simulated using the two-port eigen-excitation method on a free-standing silicon cylinder array. FIGS. 18A-18D show graphs of simulated even-mode (FIGS. 18A and 18C) and odd-mode (FIGS. 18B and 18D) absorption for top-layer (FIGS. 18A and 18B) doped and side-wall (FIGS. 18C and 18D) doped all-dielectric metasurface using two-port eigen-excitation method. The top insets in FIGS. 18A and 18C show the doped regions on the cylinders indicated with light-blue color. The bottom insets in FIGS. 18A and 18B show the power loss density for even-mode (FIG. 18A) and odd-mode (FIG. 18B) under the degenerate critical-coupling conditions. The absorption peak occurs near 1 THz with cylindrical dimensions of h=51.3 µm, r=60 µm, and p=217 µm. The photodoped region of the cylinder was decomposed into two portions—one consisting of the top of the cylinder (inset to FIG. 18A), and the other consisting of half of the cylinders' perimeter (inset to FIG. 18C). Each is simulated for various photodoped powers, ranging from a carrier density of $6.5\times10^{15}$ cm$^{-3}$ to $7.5\times10^{16}$ cm$^{-3}$ corresponding to fluences from 0 to ~27 µJ cm$^{-2}$. In FIGS. 18A-18D, the simulated absorptivity is plotted in grayscale as a function of fluence (vertical axis) and frequency (horizontal axis). It is noted that the scale of the absorptivity is from 0 to 0.5, as indicated by the colormap legend. In FIGS. 18A and 18B it can be observed that the even (FIG. 18A) and odd (FIG. 18B) eigenmodes exhibit different behavior. Namely, the even eigenmode (FIG. 18A) blue shifts with increasing fluence, but largely retains its absorptive nature. In contrast, the odd eigenmode (FIG. 18B), also blueshifts with increasing fluence, but weakens rapidly in absorptivity. For photoexcitation of the side of the cylinder we find that the mode also blue shifts, but weakens and broadens (FIG. 18C). The odd eigenmode also blue-shifts and weakens slightly, but remains greater than 0.4 for the range shown. The carrier densities achieved in this study allow the doped silicon to retain its dielectric character around 1 THz, i.e. the real part of permittivity is positive. Therefore, the minor decrease of the dielectric constant in the thin photodoped regions does not significantly alter the symmetry of the structure. This assumption is also confirmed by the small difference between reflectances $|S_{11}|^2$ and $|S_{22}|^2$, (not shown), which realize a maximum difference of 1.5% at $\omega_0$.

FIGS. 19A and 19B are graphs showing simulated eigenfrequencies of the even (square) and odd (triangle) modes for a square array of dielectric cylinders with top layer photodoping. In particular, FIG. 19A shows Eigenfrequencies for even (squares) and odd (triangles) modes respectively. FIG. 19B shows radiation loss rate $\gamma$ (cyan) and material loss rate $\delta$ (purple) for even and odd modes respectively.

Upon examination of FIGS. 18A-18D, it can be observed that the odd-eigenmode—for the top photodoped case—is strongly dependent on optical fluence in comparison to the other three cases. As mentioned, the angle of incidence of the optical pump is 20 degrees and thus, based on the difference in incident angle and the azimuthal dependence of the cylindrical sidewall, the carrier density obtained for top photodoping is four times larger than from side photodoping. Therefore, the top photodoping dominates and, in what follows, we ignore contributions from sidewall photodoping. In FIGS. 19A and 19B, the resonant frequency of both the even and odd-eigenmodes as a function of fluence are studied, for an all-dielectric cylindrical array that is photodoped from the top. As can be observed, both the resonance frequency (open triangles in FIG. 19A) and the material loss rate (open lower triangles in FIG. 19B) for the odd eigenmode show a strong dependence on fluence in comparison to the even eigenmode. It may be concluded that since the top photodoping is dominant in the study presented here, the optical excitation primarily affects the effective height of the all-dielectric array, and thus chiefly alters the odd-eigenmode. In particular, as shown in FIG. 19A, the resonance frequency of the odd and even eigenmodes both shift to higher frequencies, although the odd-eigenmode has a slope that is 2.5× greater. It was found that lifting of the degeneracy of the optimal absorptive state is primarily due to the odd-eigenmode. Further, as is shown in FIG. 19B, the radiative loss rates of both even and odd-eigenmodes are largely independent of optical fluence. However, the material loss rates for both eigenmodes increase with fluence, but again the odd-eigenmode has a much greater dependence on fluence than the even eigenmode—a factor of 2.6× in this case (for $N \leq 2.0 \times 10^{16}$ cm$^{-3}$). Thus, it was determined that critical coupling of the odd-eigenmode is broken for only modest fluences, although at high enough values, both modes eventually lose critical coupling. The metasurface explored here may thus be used for modulation of external radiation. Since the smallest dimension of our resonator is 500 times larger than the mean free path length of photo-generated carriers in silicon—a value of 100 nm—it can be expected that finite size effects will not play a role. Thus, the expected maximum modulation speed of our metasurface is determined by the carrier lifetime in bulk silicon. However, through use of alternate materials—or defect engineering—carrier lifetimes as short as sub-picosecond can be achieved on radiation-damaged silicon substrates.

Optical-pump terahertz probe (OPTP) spectroscopy were utilized in order to photoexcite carriers in the silicon. An 800-nm pump beam (8 mm in diameter) with 35-fs ultrafast pulses at repetition rate of 1 kHz is incident on the front side of the sample (cylinder side) at an incident angle of 20 degrees with respect to the surface normal. As a result, both the top and sidewall of the cylinders will be doped. The THz probe beam is incident normal to the surface with a beam size of 3 mm to ensure proper characterization of a homogeneous carrier excitation within the silicon cylinders.

Numerical simulation of transmission for various carrier densities was performed using the finite-integral frequency-domain solver provided by the commercial software CST Microwave Studio. Unit cell boundary was used for calculating the transmission and absorption spectra with normal incidence from single waveguide port. The dielectric properties of PDMS were set with dielectric constant of 1.71 and loss tangent of 0.142 at 1 THz. The dielectric properties of silicon were determined using the Drude model with appropriate carrier densities and scattering rates in the photo-doped and non-photo-doped regions.

The eigenmode absorption spectra with various photoexcited carrier concentrations were performed using commercial software COMSOL Multiphysics. To remove the substrate induced response in the DMS, a free-standing silicon array was modeled. The material settings for silicon cylinders are the same as those in the CST Microwave Studio. Periodic boundaries were used for the modeling. The two ports are set symmetric with respect to the mid-plane of the cylinder. The two excitations—one from each port—are both set with half of the electric field amplitude which is from a single-port excitation, but with 0 phase difference for even-eigenexcitation and a phase difference for odd-eigenexcitation. Then the total power input from each eigenexcitation is just half of the total power input for single-port excitation, indicating a maximum 50% of absorption for each eigenmode with respect to the total power.

The complex eigenfrequencies were simulated using an eigenmode solver in the COMSOL Multiphysics. To obtain the radiative loss rate $\gamma$ and material intrinsic loss rate $\delta$, two eigenmode simulations were performed. First, complex eigenfrequencies $\tilde{\omega}_{o(e)} = \omega_{0o(e)} - i\omega_{2o(e)}$, where $\omega_{2o(e)} = \gamma_{o(e)} + \delta_{o(e)}$, were obtained for odd-mode and even-mode respectively. Then a similar analysis with material loss removed for both the photodoped and non-photodoped regions, was repeated. In this way, the imaginary parts of the obtained eigenfrequencies do not include the material loss rate, i.e. $\delta_{o(e)} = 0$.

A significant mechanism of the loss in thermal energy is transfer to the atmosphere surrounding the absorbers via convection. Reduced thermal losses leading to higher peak absorber temperatures and therefore improvements in signal-to-noise ratio and responsivity can be realized by operating the absorber structure in a vacuum. One example implementation of this is by enclosing the entire absorber in a small hermetic vacuum chamber with infrared- and terahertz-transparent windows mounted on each side. The terahertz-transparent window may also be integrated with the infrared filter. Examples of materials for the infrared-transparent window include, but are not limited to, potassium bromide (KBr), sodium chloride (NaCl), silicon and thallium bromo-iodide (KRS5). Materials for the terahertz-transparent window include high-density polyethylene (HDPE), ultra-high molecular weight polyethylene (UHMWPE), high-resistivity silicon, gallium arsenide (GaAs), Polymethylpentene (TPX), and polytetrafluoroethylene (PTFE). The vacuum chamber may be evacuated then permanently hermetically sealed or be continually evacuated via one or more vacuum pumps.

In an example, a metasurface is found to achieve perfect absorption when two waveguide modes ($HE_{111}$, $EH_{111}$) are supported simultaneously in the unit cell. Both modes are fundamental in the cylindrical waveguide and cutoff conditions are derived as, $$r = \frac{J_{1,1} \lambda_0 \lambda}{2\pi \sqrt{\epsilon_1 - 1}} \qquad (14)$$

and $$h = \frac{\lambda_g}{2}, \qquad (15)$$

where r is radius, $J_{1,1}$ is the first positive zero of the Bessel function of the first kind, $\lambda_g$ is the guided wavelength given by $\lambda_g = \lambda_0 / \sqrt{\epsilon_1}$. Here $\epsilon_1$ is the real part of the complex permittivity ($\bar{\epsilon} = \epsilon_1 + i\epsilon_2$) of the cylinder, h is the height of the cylinder, and $\lambda_0$ is the wavelength in free space at resonance. Although, Equations (14) and (15) are valid for a broad class of metasurface response. The remaining parameters of dielectric loss and periodicity contribute significantly to the function of the metasurface. This work fixes the height, periodicity, and radius—thus the radiative rate—and varies the dielectric loss.

A design pathway DMS can be identified as described herein. Initially, a working frequency and material for the resonator may be identified. The choice of $\omega_0$ and material, i.e. $\bar{\epsilon}$, sets r, h by Equations (14) and (15). The remaining geometric parameter is periodicity (a), typically bounded by $2r < a < \lambda_0$ in order to maintain mode confinement and avoid significant diffraction effects, which sets the radiation rate of the structure. Finally, with the intended function of the metasurface in mind, a dielectric loss is chosen.

S-parameter simulations of a unit cell of the dielectric array were performed for silicon cylindrical resonators with different loss values and dimensions as noted in FIG. 20A, which illustrates a schematic of the metasurface with incident THz pulse. FIG. 20B is an image of a fabricated sample on 23 μm PDMS substrate, with dimensions r=60 μm, h=50 μm, a=172 μm. FIGS. 20C and 20D are graphs showing simulated transmission and absorption, respectively, for values of loss ranging from tan δ=0.0001 to tan δ=0.0582. The vertical line indicates an operating frequency of 1.004 THz, where T=88.9% and A=88.6% are achieved. Arrows in FIGS. 20C and 20D indicate how the transmission and absorption, respectively, evolve for increasing loss tangent FIGS. 20C and 20D show the simulated transmission and absorption, respectively, as a function of frequency for a number of different dopings ranging from $N_{min}=1.275\times10^{13}$ to an optimal doping of $N_{opt}=7.374\times10^{15}$. Remarkably, as seen in FIGS. 20C and 20D, a metasurface may be provided as a Huygens surface or, with the addition of a small amount of loss, the same metasurface can be an absorber. A maximum transmission value of 93.7% is obtained with a 0.986 THz with an associated phase of 1.3π radians for a doping value of $N_{min}$, and a maximum absorption of 99.96% at 1.02 THz for $N_{opt}$.

The experimentally realized metamaterial includes an array of silicon cylinders arranged in a square lattice on a thin PDMS substrate (see e.g., FIGS. 20A and 20B). Four separate metamaterials were fabricated, with varied concentrations of dopant atoms to achieve distinct cases of dielectric loss. For example, Table 1 below shows doped silicon wafer properties and calculated dielectric constants for the four metamaterials.

TABLE 1

| ρ (Ω · cm) | N (1 × 10$^{15}$cm$^{-3}$) | $\epsilon_1$ | $\omega_p$ (1 × 10$^{12\ rad}$) | $\omega_s$ (1 × 10$^{12\ rad}$) | tan δ |
|---|---|---|---|---|---|
| 850 | 0.016 | 11.70 | 0.357 | 9.594 | 0.0001 |
| 8.45 | 1.609 | 11.60 | 3.624 | 9.834 | 0.0127 |
| 5.50 | 2.495 | 11.55 | 4.512 | 9.927 | 0.0197 |
| 0.95 | 21.40 | 10.65 | 13.265 | 11.165 | 0.1740 |

All DMS's that were fabricated have the dimensions a=172 μm, r=60 μm, h=50 μm, on a 23 μm PDMS substrate (see e.g., FIG. 20B). The resistivity of the silicon substrate was measured for each of the four experimental cases (see Table 1) allowing estimation of the dopant concentration, and subsequently calculation of the complex permittivity of each material. In the THz regime semiconductor permittivity can be described by the Drude model as, $\tilde{\epsilon}(\omega)=\epsilon_\infty-\omega_p^2/\omega(\omega+i\omega_s)$ where, for silicon $\epsilon_\infty=11.7$ is the frequency independent, $\omega_p$ is the plasma frequency, and $\omega_s$ is the scattering frequency defined as $\omega_s=1/\tau_C$ where $\tau_C$ is the average collision time of electrons.

The loss tangent was also calculated for the experimental cases and, incorporating the Drude permittivity, can be written as, $$\tan\delta = \frac{\epsilon_2}{\epsilon_1} = \frac{\omega_s\omega_p^2/\omega}{\epsilon_\infty(\omega^2+\omega_s^2)-\omega_p^2} \quad (17)$$

which illustrates the role of doping, through the plasma frequency. The experimental investigation spans three order of magnitude in loss tangent, offering a broad set of test cases, and highlighting the versatility of semiconductors as base materials for the metasurface.

Also, explored by experiment and stimulation was the impact of dielectric loss on the DMS system. The frequency dependent response of the DMS was simulated for the four cases given in Table 1, and the fabricated samples were measured by the THz time domain spectroscopy (TDS). The results shown in FIGS. 21A-21D show a varied scattering response. Particularly, FIGS. 21A-21D are graphs showing scattering and loss with experimental (solid lines) and simulated (dashed lines) results for four cases of dielectric loss. In the figures, the lowest loss achieving the lowest absorption (see FIG. 21A), and moderate material loss achieving the highest absorption (see FIG. 21D). Experimental results (see solid lines of FIGS. 21A-21D) agree well with simulated absorbing response (see dashed lines of FIGS. 21A-21D). The low loss (see FIG. 21A) and high loss (see FIG. 21D) results realize a shift between the transmission and reflection minima, and thus the metasurface is not strongly absorbing for these cases. Notably there is no significant shift in the peak absorbing frequency in the four cases.

Figure 22A:
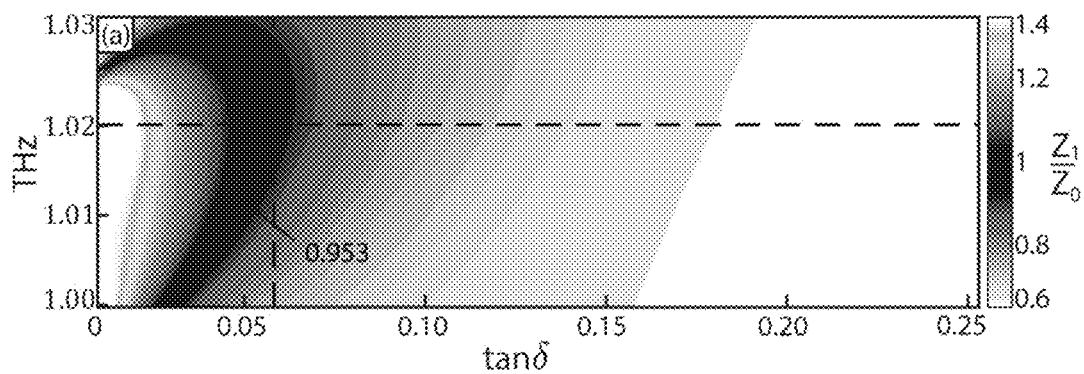
Figure 22B:
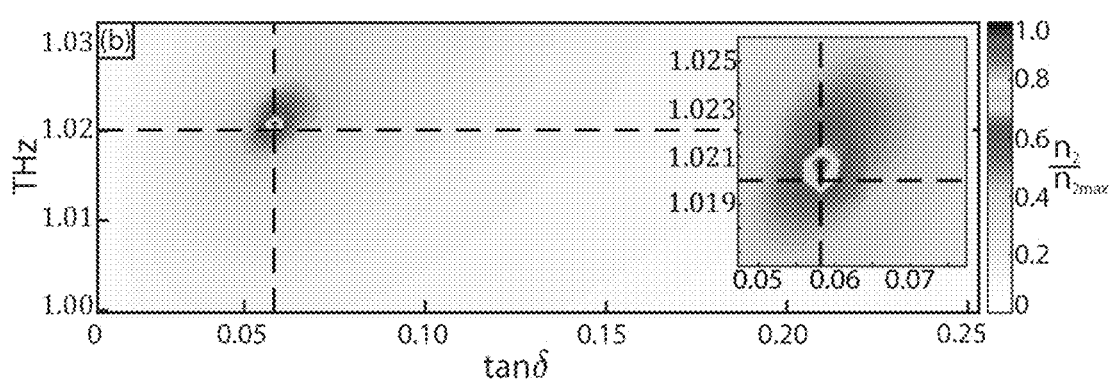
Figure 22C:
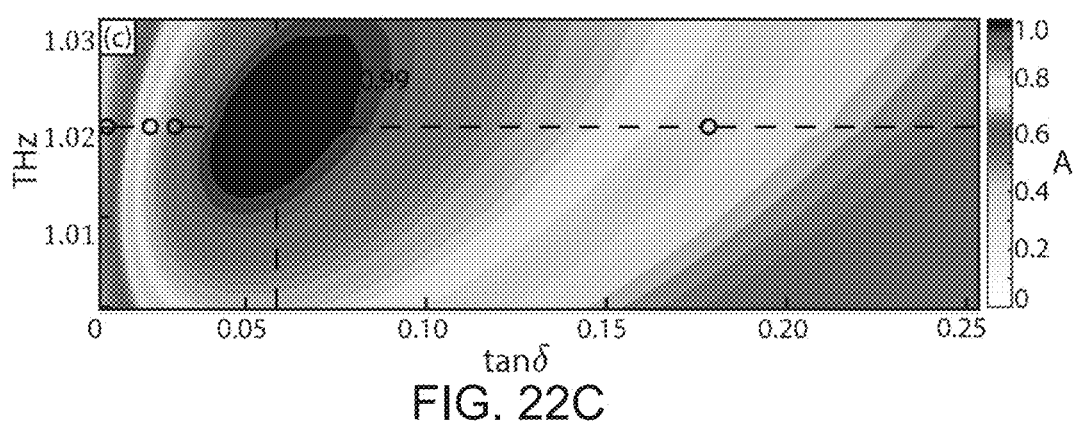
Figure 22D:
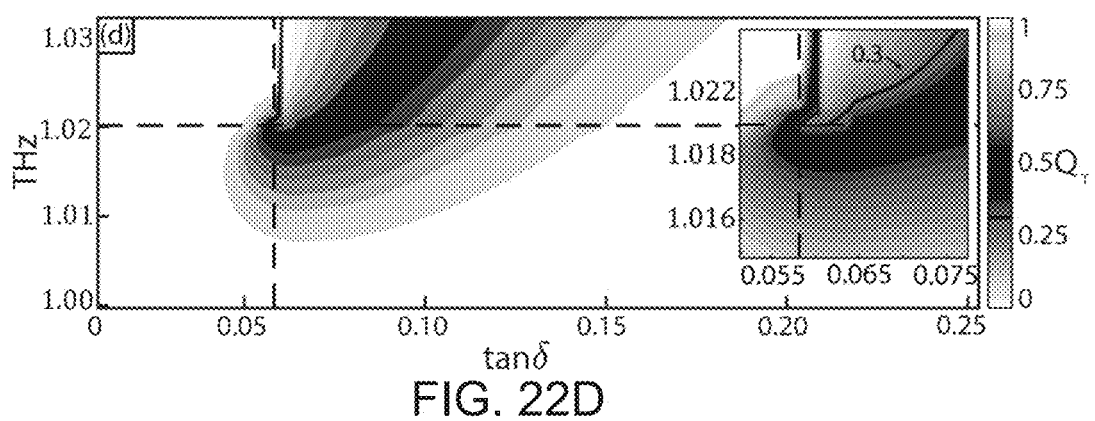

An understanding of the effects of loss on the scattering properties of the DMS was furthered by stimulation of the DMS in terms of its effective material constants of refractive index (ñ) and wave impedance (Ž), which can apply generally. The scattering and material parameters are obtained from full wave electromagnetic simulations in software, utilizing a frequency domain solver with unit cell boundary conditions. FIGS. 22A-22D are surface plots showing frequency dependent material constants as a function of dielectric loss. FIG. 22A shows a real part of the complex impedance normalized to free space. FIG. 22B shows an imaginary part of the index of refraction, normalized to its maximum value. FIG. 22C shows absorption with experimental cases are shown as open circles. FIG. 22D shows material Q-factor calculated by Equation (18). Dashed horizontal lines in the figures indicate resonant frequency (about 1.02 THz), with the dashed vertical line indicating peak absorption. In FIGS. 22A-22D, the index of refraction ($\tilde{n}=n_1+in_2$) and wave impedance ($\tilde{Z}=Z_1+iZ_2$) are presented, and they are defined at normal incidence for a system of thickness d=h. From simulation of the DMS's scattering properties, the material parameters (ñ, Ž) can be obtained.

The extracted material parameters are presented as 2D grayscale maps in FIGS. 22A-22D, with each vertical axis denoting the frequency in THz and horizontal axis the loss, i.e., tan δ. In FIG. 22A, the real part of the wave impedance is shown, normalized by the free space value $Z_0=377\Omega$. The grayscale bar scale shown to the right of the plot details the values, and it can be observed that at a frequency of $\omega_0=1.02$ THz (horizontal dashed line) and an optimal loss of tan $\delta_{opt}=0.058$ (vertical dashed line), a value of $Z_1=0.953$ $Z_0$—shown as a solid black contour curve in FIG. 22A. In FIG. 22A, the imaginary part of the refractive index is shown, normalized by its maximum value, and a value of $n_2=0.8577n_{2max}$ at $\omega_0$ and tan $\delta_{opt}$. The absorption is plotted in FIG. 22C—a black contour line shows A=99%, and a maximum value of 99.96% is achieved.

The description 0f the metamaterial in terms of its effective material constants further allows for an equivalent, simplified system to be considered. Two aspects of the system which offer insight are the material Q-factor, and field decay in a homogeneous material. In general, the material Q-factor can be expressed as the inverse of a material's loss tangent, with contributions from magnetic and electric response adding in parallel. For the metasurface effective medium the total quality factor can be defined as, $$Q_T^{-1}=Q_E^{-1}+Q_M^{-1} \quad (18)$$

where $Q_E^{-1}$ is the quality factor due to the electric response, and $Q_M^{-1}$ is the quality factor for the magnetic response. Both $Q_E^{-1}$ and $Q_M^{-1}$ can be expressed in terms of the effective optical constants as, $$Q_E^{-1} = \frac{n_2 Z_1 - n_1 Z_2}{N_1 Z_1 - N_2 Z_2},$$

$$Q_M^{-1} = \frac{n_2 Z_1 - n_1 Z_2}{n_1 Z_1 - n_2 Z_2} \quad (19)$$

Wave impedances shown in Equation (19) are normalized by $Z_0$, and ñ is the index of refraction. A total quality factor using Equation (18) for the DMS of $Q_T$=0.301 (FIG. 22D) at peak absorption is found. It is noted that, for the simple harmonic oscillator, critical damping occurs at Q=0.5. In the considered case two modes exist which, if independent, would each be expected to attain critical damping. In a linear system Q-factors add inversely, leading to a total quality factor of 0.25 in the two-oscillator system, which is comparable to the calculated value of $Q_T$=0.301.

The spatial dependence of the fields within an effective medium described by the index of refraction ñ retrieved from S-parameter simulations. The fields of an electromagnetic wave propagating in the positive z direction may be written as, $$E_x = \hat{x}\mathrm{Re}[E_0 e^{\tilde{n}k_0 z}]$$

$$H_y = \hat{y}\mathrm{Re}\left[\frac{E_0}{\tilde{z}} e^{\tilde{n}k_0 z}\right] \quad (20)$$

where $$k_0 = \frac{\omega_0}{c},$$

$E_0$ is the amplitude of the electric field, and $E_0/Z$ is the amplitude of the magnetic field in the homogeneous medium. The spatial dependence of the fields for bulk silicon were plotted in FIG. 23D, and the effective material with the properties of the DMS were plotted in FIGS. 23A and 23B for each value of tan δ, as indicated in the legend. FIGS. 23A-23D are graphs of effective material modeling for four cases of plane wave propagation in linear homogeneous media, corresponding the value of dielectric loss in silicon indicated in the legend. Particularly, FIGS. 23A and 23B show the electric and magnetic field amplitudes, respectively, in a medium with the effective material constants of the DMS. The x-axis is normalized to cylinder height, which is indicated by the gray region. Notably critical damping occurs when tan δ=0.0582, with the E-field, and H-field decaying well before the cylinder height (z/h=1). The 1/e point at critical damping is indicated by a vertical dashed line in FIGS. 23A and 23B. At FIG. 23C, the argument of the complex impedance of the metasurface, vertical line indicates critical damping. FIG. 23D shows propagation in bulk silicon. The field curves were plotted for four different loss cases, which are described as: under-damping (tan δ=0.0001) and (tan δ=0.0253), over-damping (tan δ=0.25), and critical damping (tan δ=0.0582). In the critical damping state, perfect absorption is achieved with the normalized amplitude of the E-field decaying to a calculated value of 6×10⁻³, (from its value at z=0), at a distance of z=h, i.e., the height of the cylinder (see FIG. 23A).

The physics underlying the critical behavior of the system may be further explored using temporal coupled mode theory (TCMT) and eigenfrequency simulations. For example, FIGS. 24A and 24B are graphs showing scattering at resonance. Particularly, FIG. 24A shows simulated absorption, reflection, and transmission of the HMS at 1.02 THz. Regions suitable for a Huygens metasurface (HMS), and all-dielectric metasurface absorber (DMSA) are indicated in the plot. The cutoff for the DMSA is an absorption of 98%, and is indicated by the shaded area. FIG. 24B shows the ratio of the dissipative (Δ) and radiative (Γ) rates for the $EH_{111}$ and $HE_{111}$ modes in the DMS system. Absorption peaks at tan δ=0.0582, where Δ=Γ. FIG. 24A shows the absorptivity (A), reflectivity (R), and transmissivity (T), as a function of both doping (bottom axis) and tan δ (top axis). High T can be found for the low loss case, and a maximum A at tan δ=0.058. Also determined was that the loss dependence of the complex eigenfrequency ($\tilde{\omega}=\omega_1+i\omega_2$) using an eigenvalue solver software tool for both the EH and HE modes. Eigenvalue simulations may be performed with or without material loss, thus yielding a dissipative damping rate (Δ) and radiative damping rate (Γ), where $\omega_2=\Delta+\Gamma$ (see FIG. 24B). The eigenfrequency results complement a single frequency (1.02 THz) analysis of the metasurface scattering (see FIG. 24A), and three distinct regions are identified in FIGS. 24A and 24B—under-damped $$\left(\frac{\Delta}{\Gamma} < 1\right),$$

absorbing (shaded) and over-damped $$\left(\frac{\Delta}{\Gamma} > 1\right),$$

with high absorption at (Δ=Γ) for both the EH and HE modes. Notably, both the EH and HE modes have a strong dependence on doping, with the quantity $$\frac{\Delta}{\Gamma}$$

increasing nearly linearly for both modes proportional to doping.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:
1. An imaging device comprising:
   a thermally insulating support;
   a plurality of dielectric-only metamaterial absorbers disposed on a first side of the support and configured to emit heat upon receipt of electromagnetic energy, wherein the plurality of absorbers are configured to transfer heat to the support such that transferred heat from each absorber is limited to a localized region around the absorber; and an infrared camera configured to capture a composite thermal image of the localized regions.

2. The imaging device of claim 1, wherein the absorbed electromagnetic energy is in a frequency range of approximately 90 gigahertz to 3 terahertz.

3. The imaging device of claim 1, wherein in the emitted heat has an electromagnetic wavelength in a range of approximately 8 to 14 microns.

4. The imaging device of claim 1, wherein the infrared camera faces a second side of the support opposite the first side of the support.

5. The imaging device of claim 1, wherein the support is devoid of a ground plane.

6. The imaging device of claim 1, wherein the support is made of one of polyimide, foam, aerogel, polytetrafluoroethylene, poly(methyl methacrylate), polydimethylsiloxane, and ceramic.

7. The imaging device of claim 1, wherein the support has a thickness in the range of approximately 1-10 microns.

8. The imaging device of claim 1, wherein the plurality of absorbers are substantially shaped as a cylinder.

9. The imaging device of claim 1, wherein at least one of the plurality of absorbers is substantially shaped as one of a cone, a parabolic shape, an extruded cross, and a cubical shape.

10. The imaging device of claim 1, wherein the plurality of absorbers are arranged in a rectangular or offset array.

11. The imaging device of claim 1, wherein a distance between neighboring absorbers is in a range of about 118 microns or about 0.05-0.25 times a wavelength of the absorbed electromagnetic energy.

12. The imaging device of claim 8, wherein the plurality of absorbers have a diameter of between about 120 microns and about 212 microns.

13. The imaging device of claim 1, wherein the plurality of absorbers are made of one or silicon, gallium arsenide, germanium, indium phosphide, ceramic, zirconium dioxide, diamond, silicon nitride, barium strontium titanate, and titanium dioxide.

14. The imaging device of claim 3, wherein the support has an emissivity of approximately 0.75 or higher in the emitted heat range.

15. The imaging device of claim 1, comprising a second layer of absorbers stacked on top of the plurality of absorbers.

16. The imaging device of claim 1, wherein the absorbers and support are contained within a vacuum or near-vacuum.

17. The imaging device of claim 1, further comprising a display configured to provide a real-time view of the emitted energy.

* * * * *